(12) United States Patent
Ogawa et al.

(10) Patent No.: US 7,995,536 B2
(45) Date of Patent: Aug. 9, 2011

(54) MULTI-INPUT MULTI-OUTPUT (MIMO) FOR WIRELESS TRANSMITTING AND RECEIVING STATIONS

(75) Inventors: Daisuke Ogawa, Kawasaki (JP); Takashi Dateki, Kawasaki (JP); Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 886 days.

(21) Appl. No.: 11/783,017

(22) Filed: Apr. 5, 2007

(65) Prior Publication Data
US 2008/0037409 A1   Feb. 14, 2008

(30) Foreign Application Priority Data

Apr. 28, 2006 (JP) ................................. 2006-126538

(51) Int. Cl.
*H04W 4/00* (2009.01)
*H04B 7/212* (2006.01)
(52) U.S. Cl. ......... 370/334; 370/328; 370/337; 370/338
(58) Field of Classification Search .............. 455/63.1, 455/67.16, 67.11, 114.2, 506, 517, 524–525, 455/550.1, 556.2, 561, 562.1, 575.7, 69, 455/101–103, 132–134, 418, 434, 436–440, 455/450, 509, 513–514; 370/201, 310, 319–321, 370/328–338, 347, 341–345; 375/144, 148, 375/150, 260, 267
See application file for complete search history.

(56) References Cited

U.S. PATENT DOCUMENTS

| | | | |
|---|---|---|---|
| 7,039,441 B1 * | 5/2006 | Reudink et al. ............. | 455/562.1 |
| 7,421,039 B2 * | 9/2008 | Malaender et al. ........... | 375/304 |
| 7,463,867 B2 * | 12/2008 | Luo et al. ..................... | 455/101 |
| 7,483,718 B2 * | 1/2009 | Catreux-Erceg et al. .. | 455/562.1 |
| 7,630,349 B2 * | 12/2009 | Freedman et al. ............ | 370/338 |
| 2002/0193146 A1 | 12/2002 | Wallace et al. | |

(Continued)

FOREIGN PATENT DOCUMENTS

JP   2004-072624   3/2004

(Continued)

OTHER PUBLICATIONS

Japanese Patent Office "Notice of Reason for Rejection" issued for corresponding Japanese Patent Application No. 2006-126538, mailed Jan. 11, 2011. English translation attached.

*Primary Examiner* — Meless N Zewdu
(74) *Attorney, Agent, or Firm* — Myers Wolin, LLC.

(57) ABSTRACT

A wireless terminal receives a signal from a first BTS as a communication party and a signal from a second BTS when receiving the signal from the first BTS by using a communication slot that is assigned to the terminal, the terminal comprises receiving antennas; a demodulator unit that estimates channels of received signals, and demodulates the received signals by using the estimation result; and a discriminating unit discriminating the number of transmitting antennas to be used in the first BTS in the communication slot which is assigned to the terminal, in which in the case where the number of channels that are produced between the first BTS and the terminal, which is determined according to the number of transmitting antennas, is smaller than the number of channels that can be estimated by the demodulator unit, the demodulator unit estimates the channel between the terminal and the first BTS by using a signal from the first BTS, and estimates the channel between the terminal and the second BTS by using a signal from the second BTS.

32 Claims, 30 Drawing Sheets

U.S. PATENT DOCUMENTS

| | | |
|---|---|---|
| 2005/0032521 A1* | 2/2005 | Lee et al. ............... 455/450 |
| 2005/0249180 A1 | 11/2005 | Murakami et al. |
| 2006/0063491 A1* | 3/2006 | Sudo .................. 455/63.1 |
| 2006/0202892 A1* | 9/2006 | Feng et al. ............ 342/374 |
| 2006/0221928 A1* | 10/2006 | Sharony ............... 370/347 |
| 2007/0099584 A1* | 5/2007 | Niu et al. ............. 455/101 |

FOREIGN PATENT DOCUMENTS

| | | |
|---|---|---|
| JP | 2004-080110 | 3/2004 |
| JP | 2004-120730 | 4/2004 |
| JP | 2005-516427 | 6/2005 |
| JP | 2006-054710 | 2/2006 |

* cited by examiner

FIG. 4

| Slot #1 | Slot #5 | Slot #9 |
|---------|---------|---------|
| Slot #2 | Slot #6 | Slot #10 |
| Slot #3 | Slot #7 | Slot #11 |
| Slot #4 | Slot #8 | Slot #12 |

FIG. 23

| MS | NUMBER OF ANTENNAS OF MS | COMMUNICATION BTS | NUMBER OF ANTENNAS OF BTS | INTERFERENCE ORIGIN BTS | AMOUNT OF INTERFERENCE |
|---|---|---|---|---|---|
| MS#1 | 2 | BTS#1 | 2 | BTS#2 | X |
| MS#2 | 2 | BTS#2 | 2 | BTS#1 | Y |
| ... | ... | ... | ... | ... | ... |

| MS | NUMBER OF ANTENNAS OF MS | COMMUNICATION BTS | NUMBER OF ANTENNAS OF BTS | INTERFERENCE ORIGIN BTS | AMOUNT OF INTERFERENCE |
|---|---|---|---|---|---|
| MS#1 | 2 | BTS#1 | 2 | BTS#2 | X |
| MS#2 | 2 | BTS#1 | 2 | BTS#2 | Y |
| MS#3 | 2 | BTS#1 | 2 | BTS#2 | Z |
| MS#4 | 2 | BTS#2 | 2 | BTS#1 | W |

MULTI-INPUT MULTI-OUTPUT (MIMO) FOR WIRELESS TRANSMITTING AND RECEIVING STATIONS

BACKGROUND OF THE INVENTION

Field of the Invention

The present invention relates to a wireless base transceiver station and a wireless terminal which are applied in a MIMO (multi-input multi-output) communication system and which function as a wireless transmitting station and a wireless receiving station.

In the field of radio communication in recent years, there are a large number of systems in which a wireless base transceiver station (hereinafter referred to simply as "base transceiver station") repetitively transmits a signal of one cell frequency to a wireless terminal (hereinafter referred to simply as "terminal") which is positioned at a cell of the base transceiver station. In this case, a signal from an adjacent base transceiver station with respect to the communication base transceiver station that is communicating with the terminal becomes an interference signal with respect to a transmitted signal (desired signal of the terminal) from the base transceiver station to the terminal, which leads to a fear that the communication quality is deteriorated.

In particular, in the case where the terminal is positioned at an end portion of the cell, there may be a case where a signal electric power from the communication base transceiver station which is received by the terminal is weak, and an interference signal electric power from the adjacent cell is strong. In this case, the received SIR (signal to interference ratio) is low, thereby leading to a fear that the communication quality is deteriorated.

On the other hand, a MIMO communication method, which is a communication method for increasing a communication capacity by means of a plurality of transmitting antennas and a plurality of receiving antennas, has been actively studied as a next-generation high-speed communication technology. In a general MIMO communication method, the base transceiver station transmits data streams of the transmitting antenna number, and the receiving terminal demodulates a plurality of MIMO-multiplexed data streams.

For example, as shown in FIG. 1, in the case of a 2×2 MIMO communication system, a base station (BTS: base transceiver station) #1 transmits two data streams toward a terminal (user) #1 by means of two antennas. In FIG. 1, both of BTS #2 and a User #2 conduct 2×2 MIMO communications. In this example, in the case where BTS #1 and BTS #2 have the same wireless frequency, a signal of the BTS #2 which has been transmitted from BTS #2 is an interference signal with respect to the signal (desired signal) that is transmitted from BTS #1 toward the User #1.

Up to now, there has been already proposed a method in which, when the User #1 and the User #2 are positioned at cell boundaries (overlapping portions of cells) in the environments shown in FIG. 1, the BTS #1 and the BTS #2 transmit signals that have been subjected to STC (space time coding) to make it difficult that the signals are affected by the interference components (for example, Patent document 1).

[Patent document 1] JP 2004-080110 A
[Patent document 2] JP 2004-120730 A
[Patent document 3] JP 2005-516427 A

SUMMARY OF THE INVENTION

An object of the present invention is to reduce an influence of an interference component in a wireless communication between a transmitter station and a receiver station.

In order to achieve the object, the present invention has the following structure.

That is, the present invention provides a wireless transmitting station, including:

a plurality of transmitting antennas; and a transmitting unit that transmits a signal by means of the transmitting antennas of the number of the transmitting antennas in a communication slot where the number of transmitting antennas to be used at a time of transmitting the signal is predetermined.

In the wireless transmitting station according to the present invention, the number of transmitting antennas to be used at a time of transmitting the signal is predetermined in a part of the plurality of communication slots.

Preferably, the wireless transmitting station according to the present invention, further includes a storage unit that stores a correspondence between the communication slots and the number of transmitting antennas to be used in the communication slots, in which the number of transmitting antennas to be used in the communication slot is determined through a reference of the storage unit.

Preferably, in the wireless transmitting station according to the present invention, control information including the number of transmitting antennas is predetermined in the communication slot in which the number of transmitting antennas is predetermined.

Further, the present invention provides a wireless receiving station that receives a signal from a first wireless transmitting station as a communication party and a signal from a second wireless transmitting station which is different from the first wireless transmitting station when receiving the signal from the first wireless transmitting station by using a communication slot that is assigned to the wireless receiving station, the wireless receiving station including:

a plurality of receiving antennas;

a demodulator unit that estimates a propagation path of a plurality of received signals which are received by the plurality of receiving antennas, and demodulates the plurality of received signals by using the estimation result; and a discriminating unit that discriminates the number of transmitting antennas to be used in the first wireless transmitting station in the communication slot which is assigned to the wireless receiving station, in which in a case where the number of propagation paths that are produced between the first wireless transmitting station and the wireless receiving station, which is determined according to the number of transmitting antennas, is smaller than the number of propagation paths that can be estimated by the demodulator unit, the demodulator unit estimates the propagation path between the wireless receiving station and the first wireless transmitting station by using a signal from the first wireless transmitting station, estimates the propagation path between the wireless receiving station and the second wireless transmitting station by using a signal from the second wireless transmitting station, and estimates a signal that is transmitted from the first and second wireless transmitting stations by using the propagation path estimated values which are obtained from the propagation path estimation.

According to the present invention, it is possible to reduce an influence of the interference component in the wireless communication between the transmitter (transmitting) station and the receiver (receiving) station.

BRIEF DESCRIPTION OF THE DRAWINGS

FIG. 4 shows a communication slot (a case where the communication slot is divided into a time and a frequency) in the case where the TDM and the FDM are combined with each other;

FIG. 23 shows an example of a table that is produced in a table generating unit shown in FIG. 22;

FIG. 27 shows an example of a table that is generated in the sequence shown in FIG. 26;

DETAILED DESCRIPTION OF THE PREFERRED EMBODIMENT

Hereinafter, a description will be given of the embodiments of the present invention with reference to the drawings. The configurations of the embodiments are exemplified, and the present invention is not limited to the configurations of the embodiments.

(Process of the Invention)

First of all, the process of the present invention will be described. In the communication environment shown in FIG. 1, when it is not assumed that the interference component of BTS #2 is estimated, the terminal (user) #1 has four propagation path estimating devices (channel estimating unit) in order to conduct 2×2 MIMO communication with the BTS #1.

Figure 1:
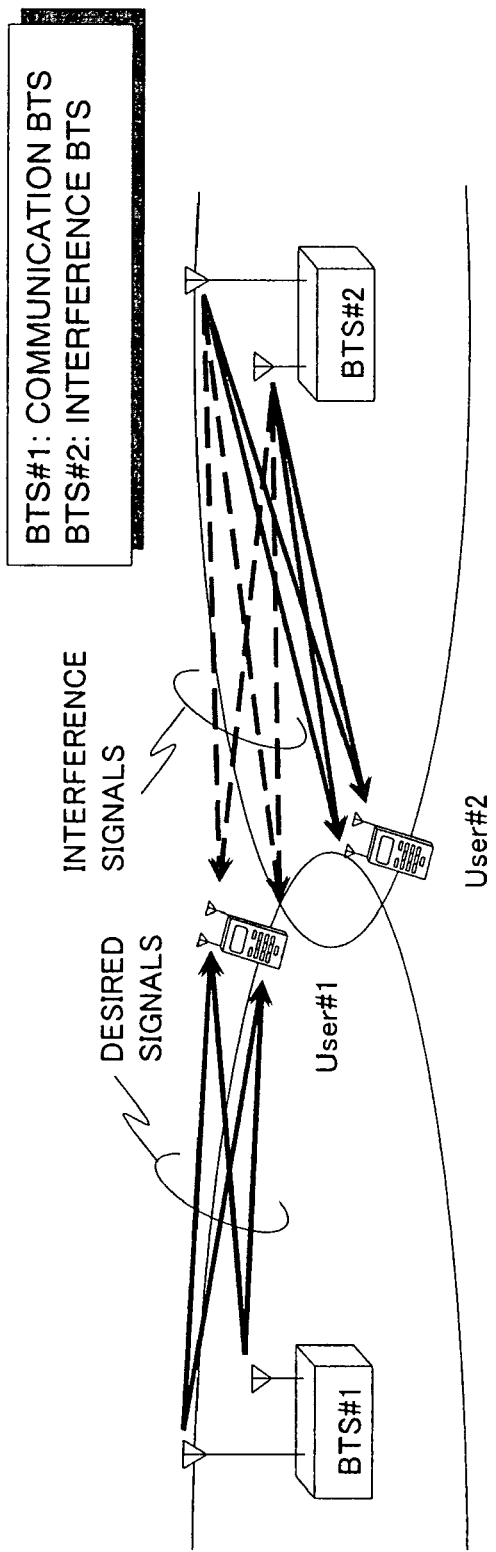
FIG. 1 is a diagram showing an example of a 2×2 MIMO system.
Figure 2:
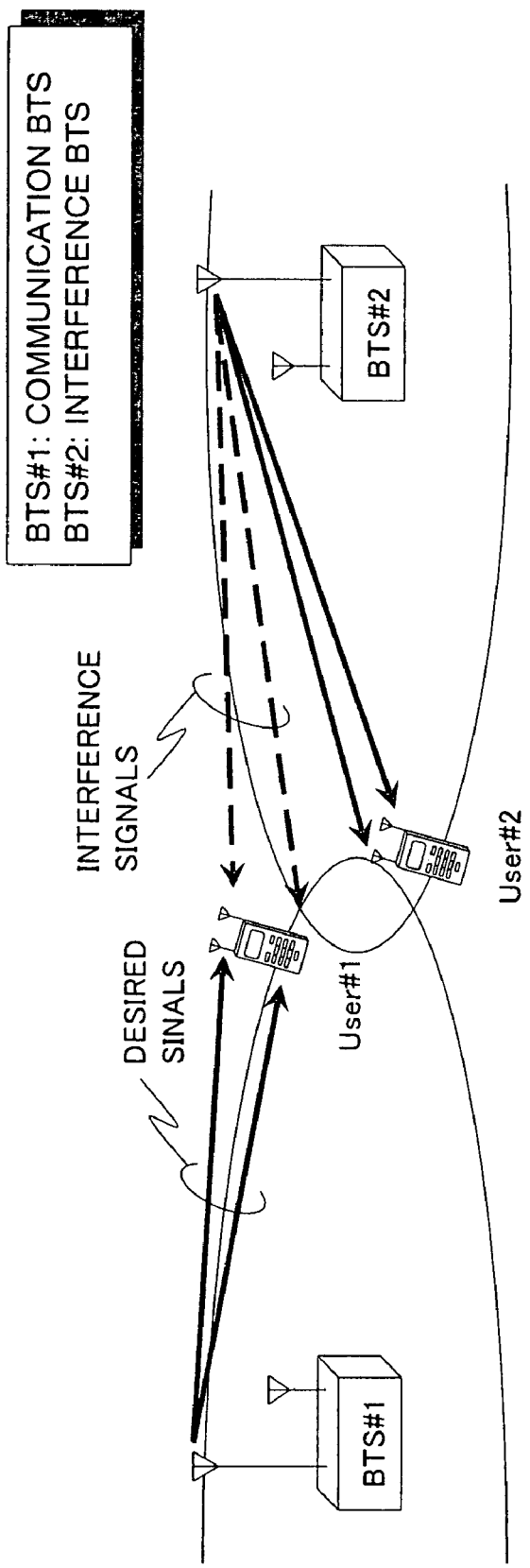
FIG. 2 is a diagram showing the MIMO communication which is conducted between a plurality of base transceiver stations, and shows the communication environments where a propagation path due to the SIMO is generated between a terminal and the respective base transceiver stations.

Except for the case where 2×2 MIMO communication shown in FIG. 1 is conducted, it can be also estimated that the MIMO communication is conducted between the base transceiver stations as shown in FIG. 2. In the example shown in FIG. 2, the two base transceiver stations (BTS #1 and BTS #2) respectively conduct a communication by means of one transmitting antenna (SIMO (single-input multi-output). In other words, the BTS #1 transmits data toward the User #1 by means of one transmitting antenna, and the BTS #2 transmits data toward the User #2 by means of one transmitting antenna.

In this case, when the User #1 demodulates data addressed to the User #1 which is transmitted from the BTS #1, it is possible to obtain desired data. In this case, the number of propagation paths (channel) between the BTS #1 and the User #1 is 2. For that reason, only two of the four propagation path estimating devices provided in the User #1 are used in communication with the BTS #1. Under the circumstances, two propagation path values (channel estimate values of the interference signal) between the BTS #2 and the User #1 are obtained by means of the remaining two propagation path estimating devices, and the data of the User #2 and the User #1 is demodulated, thereby making it possible to remove the interference component and to improve the quality of the demodulation data of the User #1.

Figure 3:
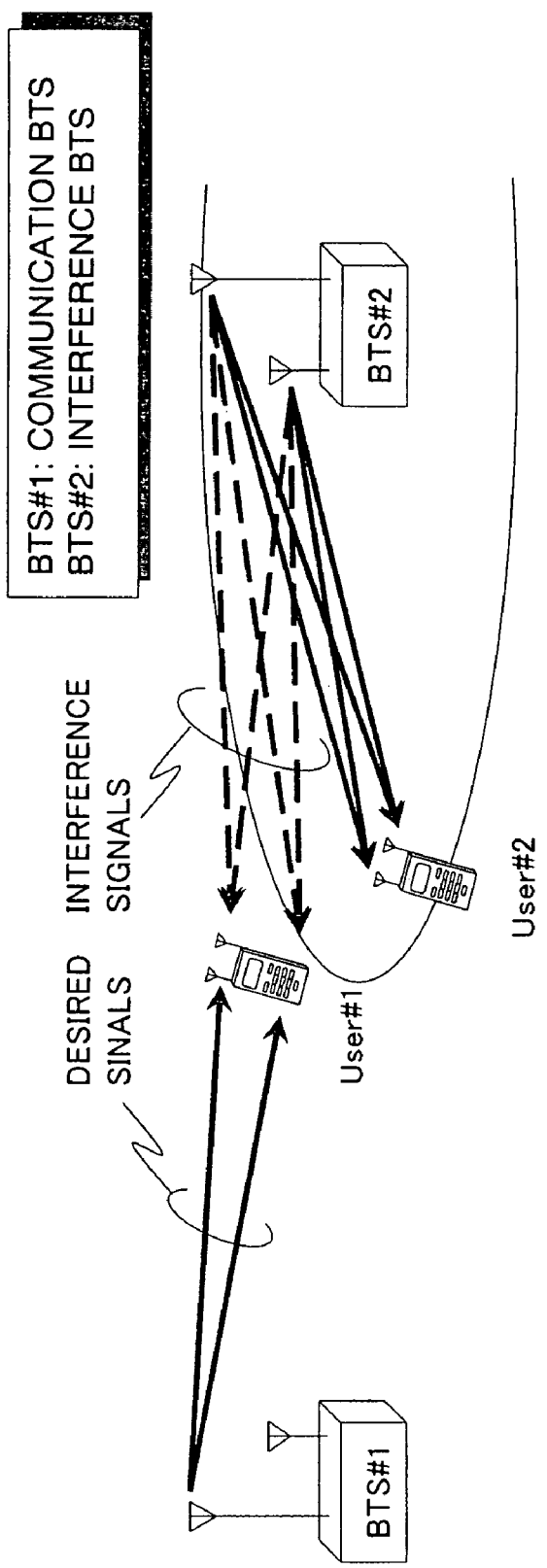
FIG. 3 is a diagram showing the MIMO communication which is conducted between a plurality of base transceiver stations, and shows the communication environments in which the propagation path due to the SIMO is generated between the terminal and one base transceiver station, and the propagation path due to the MIMO is generated between the terminal and the other base transceiver station.

However, there is no assumption that the communication is always conducted under the environments shown in FIG. 2, and there is the possibility that the communication shown in FIG. 3 is conducted. In FIG. 3, the BTS #1 conducts the SIMO (single-input multi-output) communication with respect to the User #1, and the BTS #2 conducts the 2×2 MIMO communications with respect to the User #2. In this case, the total number of propagation paths of the received signal of the User #1 is 6, which is larger than the number (4) of propagation path estimating devices owned by the User #1. For that reason, the User #1 is capable of demodulating only one of two data streams for the User #2, which have been transmitted from the BTS #2. Therefore, when the receiving characteristics of the User #1 is compared between the communication environments shown in FIG. 2 and the communication environments shown in FIG. 3, the communication environments shown in FIG. 3 are worse than the communication environments shown in FIG. 2.

The present invention is directed to a communication system that aims at reducing an interference signal from an adjacent base transceiver station (BTS #2 in FIG. 2) by not ensuring the communication environments shown in FIG. 3, but ensuring the communication environments shown in FIG. 2 with respect to the User #1. The feature of the present invention resides in that the respective base transceiver stations (a communication base transceiver station and an adjacent base transceiver station that is adjacent to a communication area of the communication base transceiver station) control the number of transmitting antennas for transmitting a signal to the communication area (cell or sector) of the subject station so that the receiving terminal is capable of reducing the interference component.

Hereinafter, embodiments of the present invention will be described. In the following description, for simplification of the description, a case of 2×2 MIMO will be described. However, the present invention can be applied to a case where the number of antennas is further increased.

Also, in the description of the following embodiments, a time slot using TDM (time division multiplexing) is applied as a communication slot that is used by the base transceiver station for communication with the terminal. The present invention is also applicable to the case where TDM is combined with FDM (frequency division multiplexing) or CDM (code division multiplexing). As an example, FIG. 4 shows a communication slot (a case where the communication slot is divided into a time and a frequency) in the case where TDM and FDM are combined together. The present invention is also applicable to the case of using the communication slot.

First Embodiment

Figure 5:
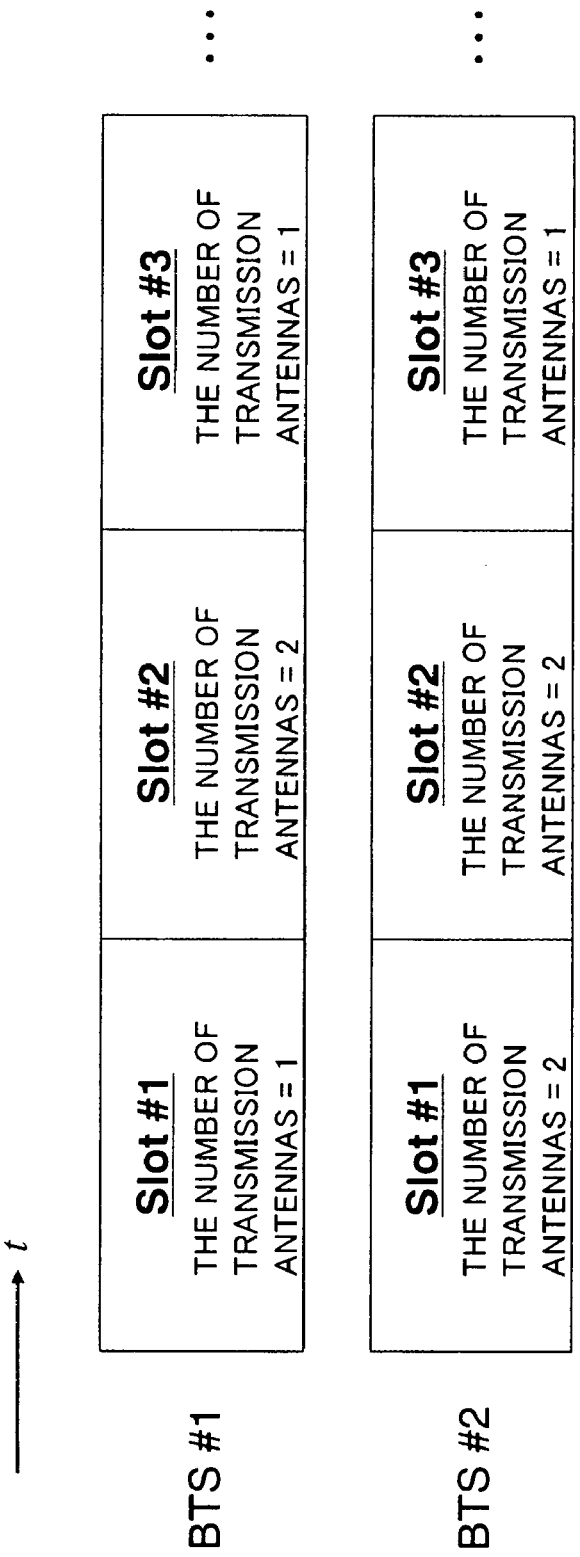
FIG. 5 is an explanatory diagram showing a first embodiment of the present invention.

FIG. 5 is a diagram for explaining a first embodiment of the present invention. In the first embodiment, a description will be given of a case where there exist a plurality of base transceiver stations (two base transceiver stations (BTS #1 and BTS #2) in FIGS. 2 and 3) in which parts of communication areas (cells) are overlapped with each other as shown in FIGS. 2 and 3.

In the first embodiment, the number of antennas which are used by the respective BTS #1 and BTS #2 is predetermined with respect to the respective communication slots (time slots) in the respective BTS #1 and BTS #2. Hereinafter, "base transceiver station" may be called "BTS". In embodiments, the BTS corresponds to a wireless transmitting station of the present invention, and the terminal or mobile station (MS) also corresponds to a wireless receiving station of the present invention.

In the example shown in FIG. 5, the number of transmitting antennas that are used in a Slot #1 of the BTS #1 is 1, the number of transmitting antennas that are used in a Slot #2 is 2, and the number of transmitting antennas that are used in a Slot #3 is 1. On the other hand, the number of transmitting antennas that are used in a Slot #1 of the BTS #2 is 2, the number of transmitting antennas that are used in a Slot #2 is 2, and the number of transmitting antennas that are used in a Slot #3 is 1. Also, the time slots of the BTS #1 and the BTS #2 are synchronized with each other, and start timings of the respective time slots are identical with each other.

The relationship between the respective time slots and the number of transmitting antennas is held and managed by, for example, memory areas in the respective base transceiver stations, and used in allocation of the time slot with respect to the terminals that exist in the cell of the subject station.

In this example, it is assumed that, for example, a terminal (corresponding to the User #1 in FIG. 1) (which receives a desired signal (communication signal) from the BTS #1 with the BTS #1 as the communication base transceiver station) which exists in the cell of the BTS #1 has two receiving antennas and four propagation path estimating devices. In addition, it is assumed that the terminal (User #1) is located in the vicinity of the boundaries of the cells of the BTS #1 and the BTS #2, and is capable of receiving electric waves (interference signal: signal that interferes with the desired signal) from the BTS #2.

In the assumption, when the BTS #1 assigns the Slot #1 to the terminal, the communication environments related to the terminal becomes a state shown in FIG. 3. That is, the terminal receives the desired signal related to the SIMO from the BTS #1 through two receiving antennas. On the other hand, since the number of transmitting antennas in the Slot #1 of the BTS #2 is 2, the terminal is capable of receiving one of the 2×2 MIMO signals that are transmitted toward another terminal (corresponding to the User #2) which exists in the cell of the BTS # from the BTS #2 through the two receiving antennas. As a result, the terminal is capable of estimating the interference component with respect to one of the two interference signals which are transmitted from the BTS #2, and removing the estimated interference component.

On the contrary, in the case where the BTS #1 assigns the Slot #3 to the terminal (User #1), the communication environments of the terminal (User #1) becomes a state shown in FIG. 2. That is, the terminal (User #1) receives the desired signal due to the SIMO from the BTS #1 and the interference signal due to the SIMO from the BTS #2 through the two receiving antennas. As a result, the terminal (User #1) is capable of estimating the propagation paths of the desired signal and the interference signal by means of the four propagation path estimating devices so as to remove the interference component.

As described above, in the first embodiment, the number of transmitting antennas which depends on the communication slot Nos. in the respective BTSs is defined. In order to reduce the interference component by separating the plurality of receiving antennas for use, it is necessary that the terminal knows a correspondence (slot configuration) between the slot No. to be used in the respective BTSs and the number of transmitting antennas.

For that reason, for example, a plurality of kinds of formats indicative of the correspondence (slot configuration) of the slot No. and the number of transmitting antennas in the respective BTSs are prepared within the terminal in advance, and one format is specified by a scramble code for distinguishing the BTSs (make the format and the scramble code correspond to each other). As a result, the terminal is capable of determining the corresponding slot configuration from the scramble codes of the respective BTSs.

Alternatively, it is possible to apply a configuration that notifies the terminal of information (slot configuration) on the number of transmitting antennas by means of the control channel. In this case, the terminal is capable of recognizing (grasping) the slot configurations of the respective BTSs through the demodulation of the control channel.

Second Embodiment

Figure 6:
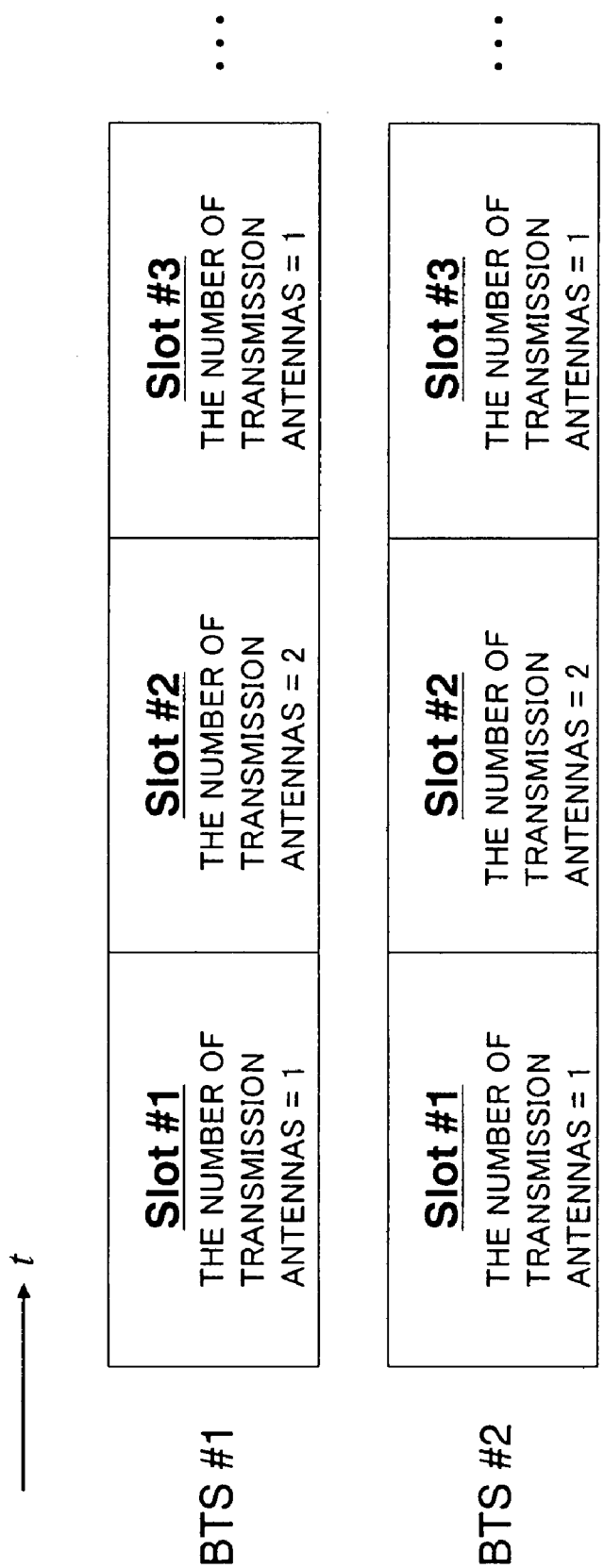
FIG. 6 is an explanatory diagram showing a second embodiment of the present invention.

Subsequently, a second embodiment of the present invention will be described. FIG. 6 is an explanatory diagram of the second embodiment, and shows slot configurations in a communication base transceiver station (BTS #1 of FIGS. 2 and 3) of the terminal and its adjacent base transceiver station (BTS #2 of FIGS. 2 and 3).

In the second embodiment, the same number of transmitting antennas is defined in slots (having the same slot Nos.) at the same times in the respective BTSs (the number of antennas to be used for transmitting the signal by the base transceiver station is the same). Also, in the second embodiment, the number of transmitting antennas corresponding to the slot No. is predetermined, and the number of transmitting antennas corresponding to the respective time slots to be used in the respective BTSs is fixed.

According to the second embodiment, for example, in the case where the terminal has two receiving antennas and four propagation path estimating devices, when the terminal is assigned to the Slot #2, the communication environments of the terminal becomes a state shown in FIG. 1, and the effect of reducing the interference component cannot be expected. However, in the case where the terminal is assigned to the Slot #1 or #2, the interference component can be reduced because the environments become the communication environments shown in FIG. 2.

Also, in the second embodiment, the communication formats (slot configurations) of the respective BTSs are different from those in the first embodiment, and the number of transmitting antennas corresponding to the same slot No. is unified among the plurality of BTSs. For that reason, it is unnecessary that the terminal takes the number of transmitting antennas to be used in the adjacent BTS into consideration.

Third Embodiment

Figure 7:
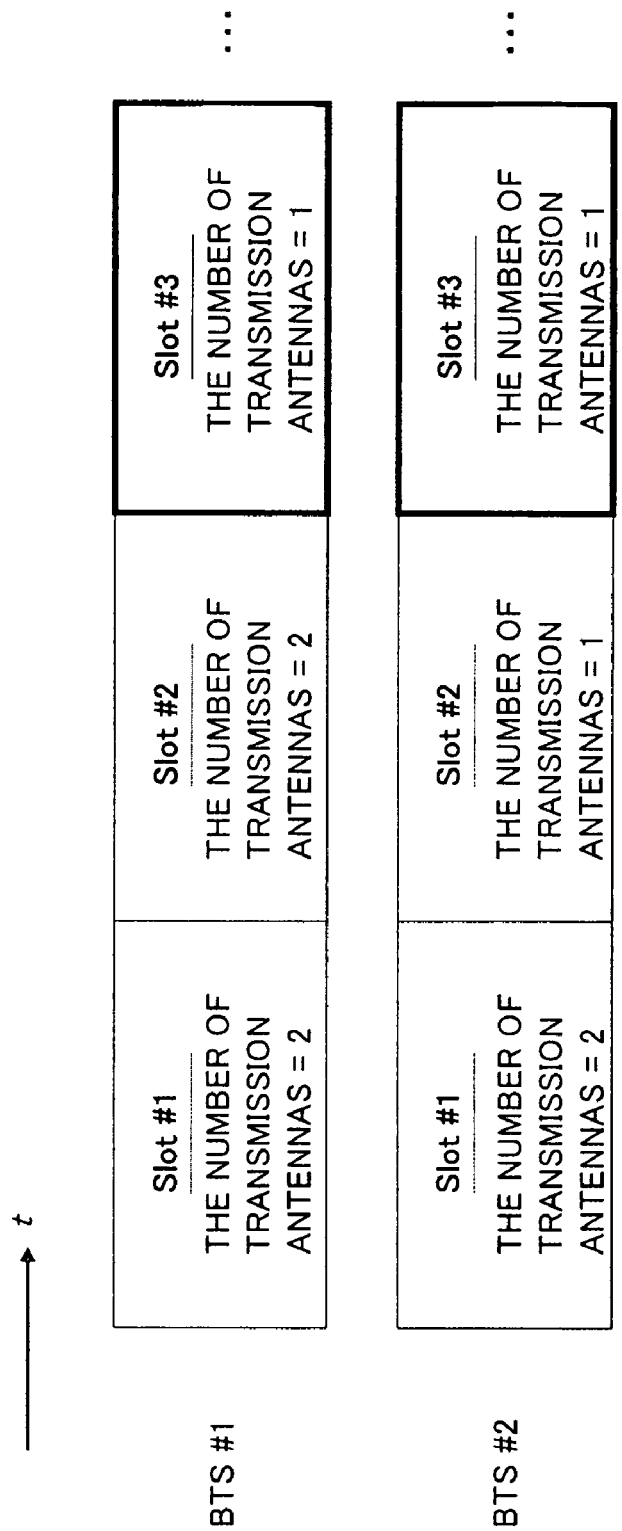
FIG. 7 is an explanatory diagram showing a third embodiment of the present invention.

Subsequently, a third embodiment of the present invention will be described. In the third embodiment, the number of transmitting antennas is fixedly defined in a part of a plurality of communication slots. FIG. 7 is an explanatory diagram of the third embodiment, and shows slot configurations in the communication base transceiver station (BTS #1) of the terminal and its adjacent base transceiver station (BTS #2).

In an example shown in FIG. 7, the number of transmitting antennas is defined in only a Slot #3 indicated by a bold closing line in the respective base transceiver stations (BTS #1 and BTS #2). In the slots #1 and #2, the number of transmitting antennas to be used by the BTS is changed according to the terminal (user) that is assigned to those slots. In the example shown in FIG. 7, in the Slot #3, the numbers of transmitting antennas to be used by the BTS #1 and the BTS #2 are identical with each other in the Slot #3, but the number of transmitting antennas which is different between the BTSs can be defined as described in the first embodiment.

The BTSs #1 and #2 control the number of transmitting antennas related to the slots #1 and #2 according to the terminal. For that reason, the terminal is incapable of knowing the determined number of transmitting antennas at the time when the terminal determines the number of transmitting antennas in the slots #1 and #2. For that reason, the respective BTSs #1 and #2 transmit information related to the number of transmitting antennas which is determined in the slots #1 and #2, and the terminal determines whether the interference component due to the interference signal can be removed or not, on the basis of the information that is received from the respective BTSs.

Since the number of transmitting antennas with respect to the Slot #3 is fixed, it is possible that the number of transmitting antennas with respect to the Slot #3 is known by the terminal. Therefore, it is unnecessary that the respective BTSs transmit (notify) information on the number of transmitting antennas to the terminal as to the slot having the fixed number of transmitting antennas.

In general, an influence of the interference signal from the adjacent base transceiver station becomes larger as the terminal that exists on the cell approaches the cell boundary more, and the influence of the interference signal becomes smaller as the terminal that exists on the cell approaches the communication base transceiver station more. Therefore, when the Slot #3 (the number of transmitting antennas is 1) is assigned to a terminal that is positioned at the cell boundary (overlapped portion) or in the vicinity of the cell boundary, the communication environments shown in FIG. 2 can be enjoyed at that terminal, thereby making it possible to enhance the communication quality through the removal of the interference component.

As described above, it is preferable that the number of transmitting antennas by which the terminal is capable of enjoying the communication environments shown in FIG. 2 is defined with respect to the slot having the number of transmitting antennas fixed, and is preferentially assigned to the terminal (in the vicinity of the cell boundary) that is high in the possibility that the slot is affected by the interference signal.

Fourth Embodiment

Subsequently, a fourth embodiment of the present invention will be described. In the communication system described in the first to third embodiments, the respective base transceiver stations (BTS #1 and BTS #2) are capable of changing the modulation system of data which is transmitted to the terminal for each of the communication slots.

In the system having the modulation system changed in each of the communication slots as described above, it is necessary that the terminal knows the data modulation system that is applied to the respective BTSs #1 and #2 in order to demodulate the signals from the respective BTSs #1 and #2. In the fourth embodiment, the same data modulation system is defined in the communication slot at the same time (the same slot No.) when the number of transmitting antennas is fixedly defined.

For example, in the slot configuration shown in FIG. 6, the modulation system "QPSK (quadrature phase shift keying)" is determined with respect to both communication slots of the BTSs #1 and #2, for example, the Slot #1, the modulation system "16QAM (16 quadrature amplitude modulation)" is defined with respect to the Slot #2, and the modulation system "64QAM" is defined with respect to the Slot #3.

In the case where the communication base transceiver station and the adjacent base transceiver station are different from each other in the modulation system at the same slot, it is necessary to notify the terminal of the modulation system at the adjacent base transceiver station. This is because the terminal is incapable of demodulating the interference signal unless the terminal knows the modulation system of the adjacent base transceiver station. On the other hand, the terminal is capable of knowing the modulation system in the communication base transceiver station through the notification from the communication base transceiver station or the static setting of the modulation system with respect to the slot.

In this case, the terminal is capable of also knowing the modulation system in the adjacent base transceiver station at the same timing (slot) when the terminal recognizes the modulation system in the communication base transceiver station with respect to the communication slot that is assigned to the terminal per se. Therefore, a process of determining the modulation system of the adjacent base transceiver station by the terminal is omitted, and a processing load at the terminal is reduced. Also, it is possible to suppress the terminal from applying the modulation systems that are different in each of the receiving antennas.

Fifth Embodiment

Subsequently, a fifth embodiment of the present invention will be described. In the fifth embodiment, in the communication system described in the first to third embodiments, the number of transmitting antennas and the modulation system in the communication slot of the respective base transceiver stations are controlled (changed) according to the terminal that is assigned to the communication slot.

Figure 8:
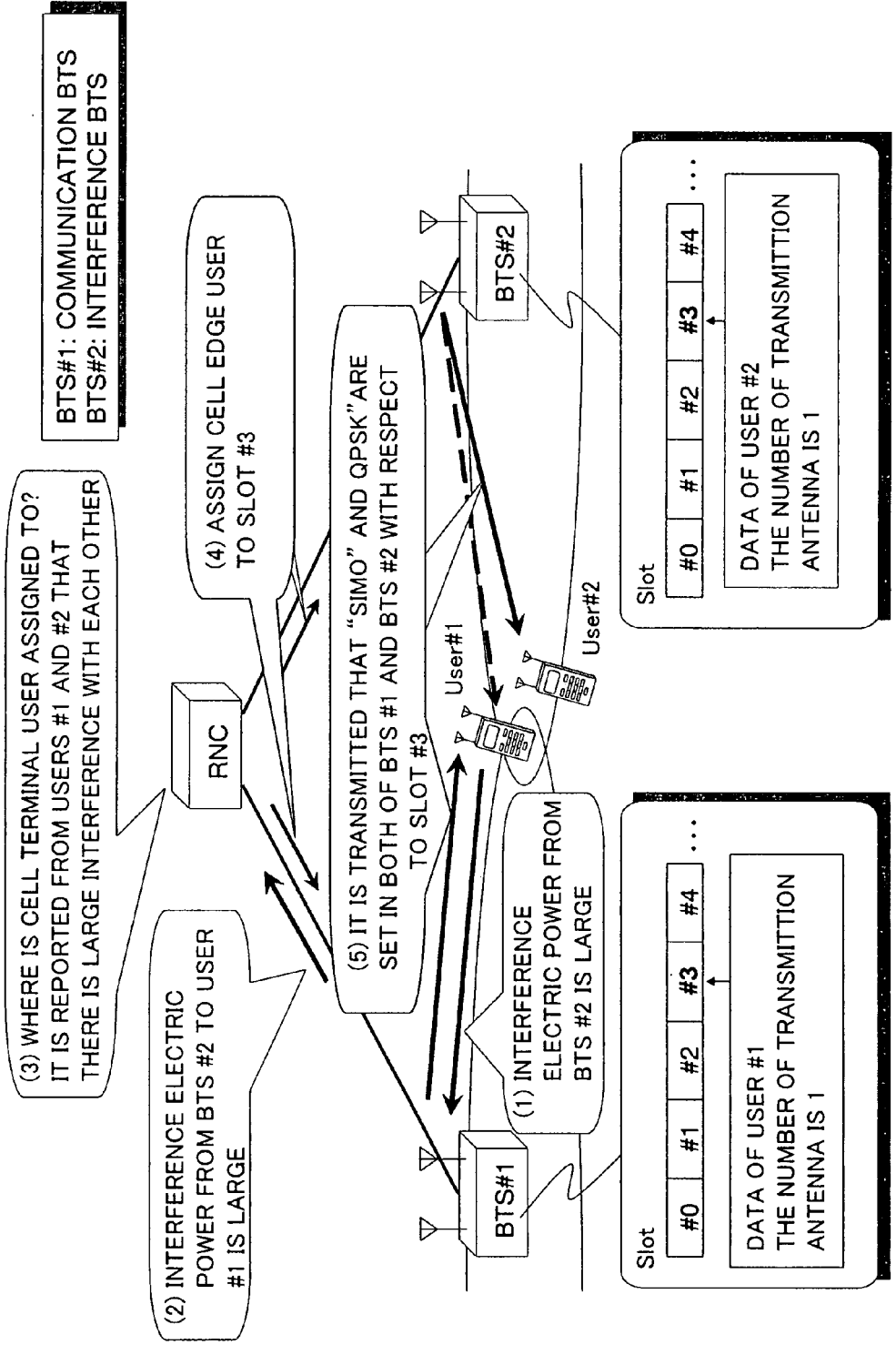
FIG. 8 is a diagram showing an example of a communication system according to a fifth embodiment.

FIG. 8 is a diagram showing an example of a communication system according to a fifth embodiment. In the example shown in FIG. 8, there exist two base transceiver stations (BTS #1 and BTS #2), the BTS #1 communicates with the terminal (User #1), and the BTS #2 communicates with the terminal (User #2). The BTS #1 and the BTS #2 are connected to an RNC (radio network controller: base transceiver station control device) that precedes the base transceiver stations and controls the respective base transceiver stations.

In the fifth embodiment, the assignment of the communication slot to the user (terminal) is determined through the following procedure.

(1) The terminal reports the interfered adjacent base transceiver station to the base transceiver station (communication base transceiver station) that is communicating. For example, the User #1 transmits a signal (report signal) including information such that "an interference electric power from the BTS #2 (User #2) is large" to the BTS #1, and the User #2 transmits a signal including information such that "an interference electric power from the BTS #1 (User #1) is large" to the BTS #2.

(2) The BTS #1 and the BTS #2 that have received the report signal notifies the RNC of the report.

(3) The RNC is capable of knowing through the report from the BTS #1 and the BTS #2 the fact that the signal from the BTS #2 which is the adjacent base transceiver station of the User #1 greatly affects the User #1 as the interference signal, and the signal from the BTS #1 which is the adjacent base transceiver station of the User #2 greatly affects the User #2 as the interference signal. In this case, the RNC determines that the User #1 and the User #2 are paired which are factors that interfere with each other.

(4) The RNC instructs the BTS #1 and the BTS #2 to assign the slots (slots at the same time) of the same slot number to the User #1 and the User #2 that are determined as a pair. In an example shown in FIG. 8, the RNC instructs the BTS #1 and the BTS #2 to assign the Slot #3.

(5) The BTS #1 and the BTS #2 assign the User #1 and the User #2 to the Slot #3 according to an instruction from the RNC, and notify the User #1 and the User #2 of the slot number.

After that, in the determined Slot #3, the SIMO communication using the QPSK modulation is conducted with respect to the User #1 and the User #2.

In the above-mentioned process, since the RNC does not grasp the number of receiving antennas (two in the example of FIG. 8) provided in each of the User #1 and the User #2, the number of transmitting antennas is not instructed from the RNC to the base transceiver station (BTS #1 and BTS #2). For that reason, the BTS #1 and the BTS #2 determine the number of transmitting antennas to be used by the instructed Slot #3, and transmit a signal to the respective User #1 and User #2 by means of the transmitting antennas of the determined number.

The number of transmitting antennas is notified the User #1 and the User #2 of together with the assigned slot No. from the respective base transceiver stations. In addition, the number of transmitting antennas as well as the data modulation system can be notified. In the example shown in FIG. 8, the slot number (Slot #3), the number of transmitting antennas "1", and the modulation system "QPSK" are notified the respective terminals of from the respective base transceiver stations.

In particular, in the example shown in FIG. 8, the number of receiving antennas of the respective User #1 and User #2 is 2. In this case, in order to reduce the interference in the respective users, it is desirable that the respective BTS #1 and BTS #2 use one transmitting antenna. However, there may occur a status in which one (for example, BTS #1) of the paired BTSs uses two transmitting antennas, and the other BTS (BTS #2) uses one transmitting antenna. In this case, it is impossible that the User #2 reduces the interference from the BTS #1. On the contrary, it is possible that the User #1 removes the interference for one transmitting antenna of the BTS #2.

In the procedure (3), when the RNC is capable of grasping the number of receiving antennas provided in each of the User #1 and User #2, it is possible to designate the number of transmitting antennas to be used by the BTS #1 and the BTS #2. For example, in the case where each of the User #1 and the User #2 has two receiving antennas, the RNC can designate "1" as the number of transmitting antennas to be used in the slot (Slot #3) that is determined to be assigned with respect to the BTS #1 and the BTS #2. As a result, it is possible to reduce the efficient interference in the respective users.

As a method in which the RNC grasps the number of receiving antennas of the user (terminal), there can be applied the following method. In other words, a database that registers terminal information (user information) therein is produced on a storage device (storage area) which can be accessed by the RNC. The numbers of receiving antennas in the respective terminals are registered in the database. In the case where two terminals are determined as a pair according to a report from the BTS, the RNC retrieves the number of receiving antennas in the respective paired terminals from the database, and designates the number of transmitting antennas corresponding to the retrieval result with respect to the respective BTSs. In this case, the number of transmitting antennas is determined so as to be smaller than the number of receiving antennas.

Also, the effect of removing the interference component at the terminal becomes larger as the position of the terminal is closer to the cell boundary, and smaller as the position of the terminal approaches the communication base transceiver station more. From this viewpoint, in the procedure (3), it is possible to take into consideration information indicative of whether the terminal is positioned on the cell boundary or in the vicinity of the base transceiver station. The interference component from the adjacent base transceiver station becomes larger as the position of the terminal approaches the cell boundary more. As a result, the amount of interference (interference electric power) is included in the report from the terminal, and it is determined whether the amount of interference is larger than a given threshold value or not, thereby making it possible to grasp whether the terminal is positioned at the cell boundary or in the vicinity of the base transceiver station. In this case, in the case where the RNC determines that the terminal position is in the vicinity of the base transceiver station, the RNC is capable of determining that the slot assignment for removing the interference component is not conducted. For example, the terminals that are positioned in the vicinity of the communication base transceiver station, respectively, are paired, and the communication environments (SIMO communication) shown in FIG. 2 are not created in order to remove the interference components, but the communication environments that conduct the 2×2 MIMO communication which increases the communication volume shown in FIG. 1 can be created.

In addition, in the procedure (5), the respective base transceiver stations are capable of notifying the terminal of the modulation system or the number of transmitting antennas to be used in the slot as the control information. Further, it is possible to include the information which indicates that the communication slot is assigned so as to reduce the interference component (interference reduction slot assignment implementing information) in the control information.

For example, in the case where the RNC determines the users (terminals) that are positioned at the cell boundary as a pair, the RNC is capable of notifying the base transceiver station of the interference reduction slot assignment implementing information that "the slot is so assigned as to reduce the interference component".

Alternatively, in the case where the RNC determines the users (terminals) that are positioned in the vicinity of the communication base transceiver station, respectively, as a pair, the RNC does not instruct the slot assignment for reducing the interference as described above, but is capable of notifying the base transceiver station of the interference reduction assignment implementing information that "the intentional slot assignment is not conducted so as to reduce the interference component". In this case, it is unnecessary to determine the terminals as a pair.

Alternatively, in the case where the RNC determines a terminal that is positioned at the cell boundary and the terminal that is positioned in the vicinity of the communication base transceiver station as a pair, it is possible to notify the terminal of the information that "the assignment cannot be performed so as to reduce the interference component". The terminal is capable of knowing whether the interference component can be reduced on the basis of the interference reduction slot assignment implementation information that is notified through the base transceiver station. That is, it is possible to determine whether the receiving antenna is assigned to the interference signal or not, on the basis of the information.

Sixth Embodiment

Subsequently, a sixth embodiment of the present invention will be described. The sixth embodiment corresponds to a modified example of the fifth embodiment. In the sixth embodiment, the slot No. that is instructed from the RNC to the respective base transceiver stations is determined in advance.

For example, in an example shown in FIG. 8, the slot No. that is instructed from the RNC to the BTS #1 and the BTS #2 is only the Slot #3. The other slot Nos. can be assigned to the users (terminals) by the respective base transceiver stations (BTS #1 and BTS #2), uniquely.

Seventh Embodiment

Subsequently, a seventh embodiment of the present invention will be described. The seventh embodiment corresponds to a modified embodiment of the fifth or sixth embodiment. In the seventh embodiment, the same number of transmitting antennas is defined among the plurality of base transceiver stations in the communication slot that is assigned to the respective paired terminals according to an instruction from the RNC which is described in the fifth or sixth embodiment.

For, example, in the example shown in FIG. 8, the BTS #1 and the BTS #2 use the same number of transmitting antennas (one antenna in FIG. 8) in the Slot #3 that is instructed by the RNC. In the fifth embodiment, a description is given of a case where the number of transmitting antennas is instructed from the RNC, and a case where the number of transmitting antennas is not instructed from the RNC. In the former case, the RNC instructs the same number of transmitting antennas to the respective BTSs (in the example of FIG. 8, instruct the number of transmitting antennas "1"). In the latter case, for example, it is defined that the number of transmitting antennas in the Slot #3 is always "1" in advance, and the definition is stored and managed in the respective base transceiver stations in advance.

According to the seventh embodiment, for example, the number of transmitting antennas by which the terminals conduct the SIMO communication between the communication transceiver station and the adjacent base transceiver station, respectively, is fixed with respect to the slot No. that is instructed from the RNC, thereby making it possible that the respective paired terminals enjoy the communication environments shown in FIG. 2.

Eighth Embodiment

Subsequently, an eighth embodiment of the present invention will be described. The eighth embodiment corresponds to a modified example of the fifth to seventh embodiments. In the eighth embodiment, the same modulation system is determined between the base transceiver stations as the modulation system of the data in the slot that is instructed from the RNC, which is described in the fifth to seventh embodiments, and the determined modulation system is notified the respective terminals of.

The notification of the modulation system is conducted through the control channel between the base transceiver and the terminals. The modulation system is made identical between the base transceiver stations, and each of the terminals demodulates the control channel from one base transceiver station (one of the control channels that are transmitted from the BTS #1 and the BTS #2), thereby making it possible to know the modulation system of the signal received from the respective base transceiver stations in the slot that is assigned to the subject station. As a result, it is possible to reduce the amount of processing of the terminal.

Ninth Embodiment

Subsequently, a ninth embodiment of the present invention will be described. The ninth embodiment relates to a method of reporting an interference component from an adjacent base transceiver station which is measured by a terminal in the fifth embodiment.

The terminal measures the amount of interference from the adjacent base transceiver station, and reports the interference component from the adjacent base adjacent station to the base transceiver station (communication base transceiver station) that is communicating. In the ninth embodiment, the interference components of N base transceiver stations which are higher in the interference component are reported to the communication base transceiver station.

Figure 9:
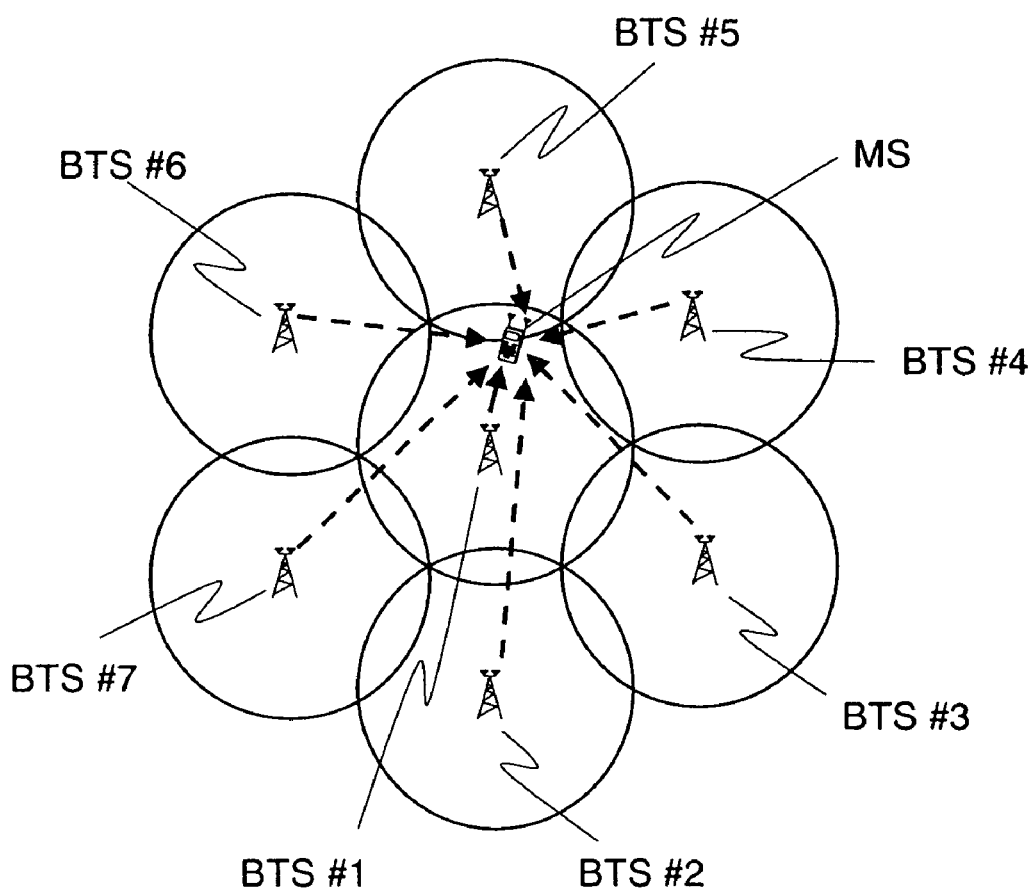
FIG. 9 is a diagram showing an example of a multi-cell environment according to a ninth embodiment.

FIG. 9 is a diagram showing an example of a multi-cell environment to which the ninth embodiment is applied. Referring to FIG. 9, the terminal (MS: mobile station) communicates with the BTS #1 as the communication base transceiver station. The BTS #2 to a BTS #7 that are adjacent base transceiver stations which are partially overlapped with the cell of the BTS #1 exist in the periphery of the BTS #1.

The signals (received by the MS) which are transmitted by the BTS #2 to the BTS #7 to their cells are the interference components (interference signals) with respect to a signal (desired signal) that is transmitted from the BTS #1 to the MS. The MS obtains received signal electric powers (interference electric powers) from the BTS #2 to the BTS #7, respectively. In this case, in the case where the interference electric power is larger, for example, in the order of the BTS #5, the BTS #6, the BTS #4, the BTS #3, the BTS #2, and the BTS #7, the MS reports the interference electric power (the amount of interference) to the BTS #1 that is the communication base transceiver station with respect to the higher N (previously defined) base transceiver stations among the base transceiver stations that transmit the interference electric powers.

In this case, the MS reports (notifies) the BTS #1, for example, that "the amount of interference of the BTS #5 is X", or "the amount of interference of the BTS #6 is Y" (in the case of N=2). For example, values (interference electric power values) that have been actually measured by the MS can be applied to the amounts of interference "X" and "Y". Alternatively, a relative value of the amount of interference "X" can be applied as the amount of interference "Y".

The identification information of the base transceiver station which is notified together with the amount of interference is determined as follows. For example, when the signals from the respective base transceiver stations are so structured as to be scrambled by different scramble codes, the scramble code Nos. of the respective base transceiver stations are used as the identification information of the BTSs, and the scramble code Nos. are informed the communication base transceiver station of as the BTS Nos. together with the amount of interference.

Tenth Embodiment

Subsequently, a tenth embodiment of the present invention will be described. In the tenth embodiment, the users (terminals) that are positioned at the cell boundary (overlapped portion of the cells) are handed over so as to be evenly assigned to the respective base transceiver stations.

Figure 10:
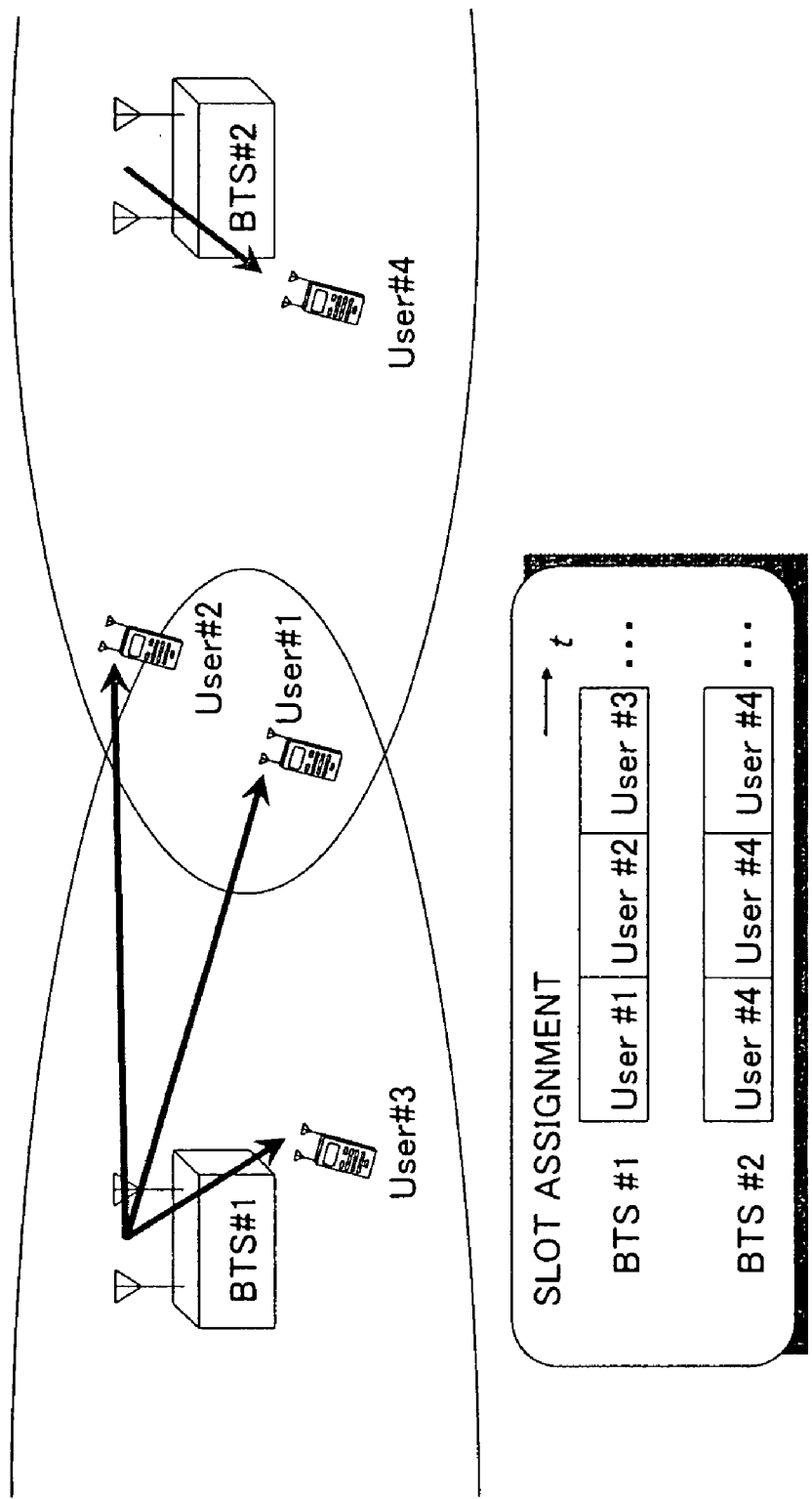
FIG. 10 is a diagram showing an example of a communication system according to a tenth embodiment.

FIG. 10 is a diagram showing an example of a communication system in the tenth embodiment. In FIG. 10, a 2×2 MIMO system is assumed, and terminals that communicate with the BTS #1 are the User #1 to the User #3 whereas a terminal that communicates with the BTS #2 is the User #4. The User #1 and the User #2 are positioned at the cell boundary.

Referring to FIG. 10, the User #1 and the User #2 have the environments similar to each other. In other words, the User #1 and the User #2 are greatly affected by the interference signal from the BTS #2 as the adjacent base transceiver station. In this case, it is preferable to remove the interference component through the communication slot assignment as described in the first to eighth embodiments after one of the User #1 and the User #2 is handed over to the BTS #2, from the viewpoint of an improvement in the communication quality.

Figure 11:
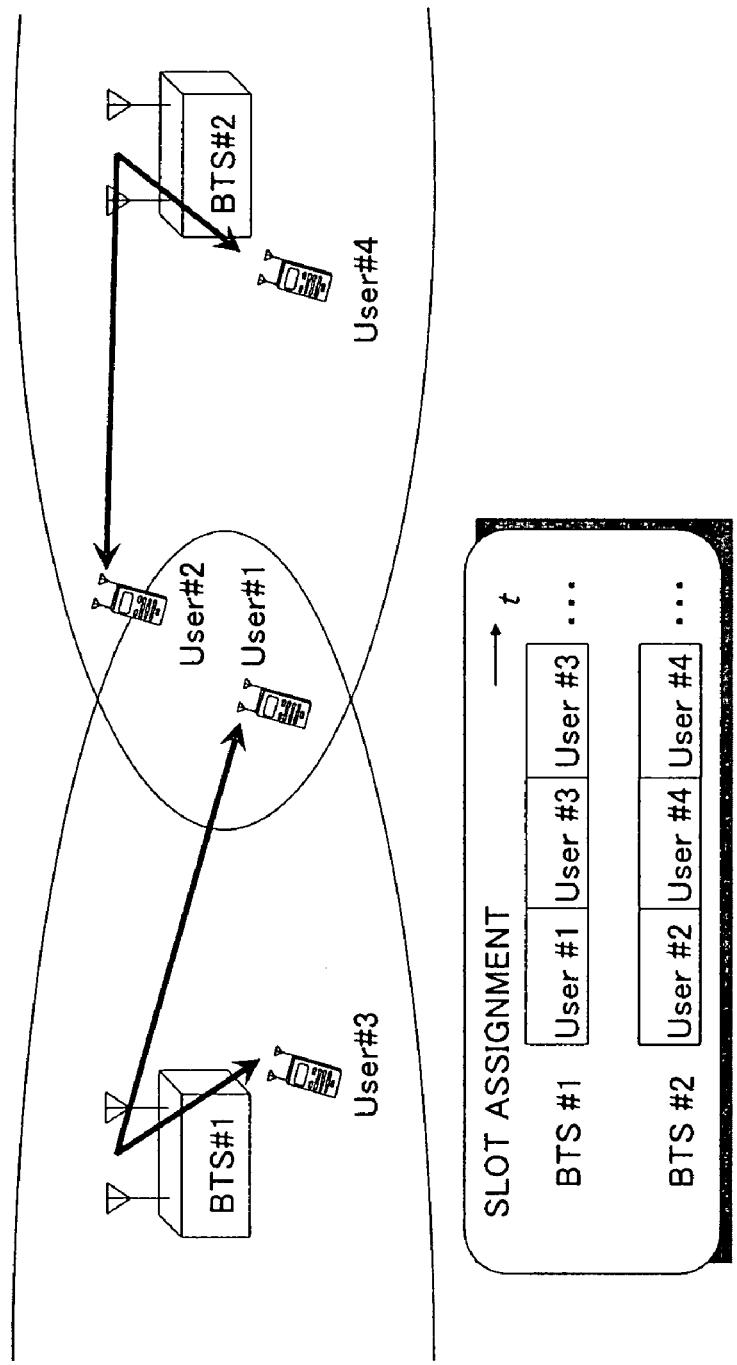
FIG. 11 is a diagram showing an example in which a terminal (User #2) shown in FIG. 10 is handed over to BTS #2.

Therefore, for example, as shown in FIG. 11, the User #1 is assigned to the BTS #1, and the User #2 is assigned to the BTS #2. According to the result, the User #2 is handed over to the BTS #2. Alternatively, the User #1 may be handed over to the BTS #2.

The terminal to be handed over can be determined as follows. For example, the terminal to be handed over is determined on the basis of the magnitude of the received electric power from the respective BTSs of the User #1 and the User #2. In the case where the received electric powers from the BTS #2 in the User #1 and the User #2 are compared with each other, when the received electric power in the User #2 is larger, the User #2 is forcedly handed over to the BTS #2 as shown in FIG. 11.

Eleventh Embodiment

Subsequently, an eleventh embodiment of the present invention will be described. In the eleventh embodiment, a manner of reducing the interference component through the communication slot assignment as described in the first to tenth embodiments is performed between respective sectors.

Figure 12:
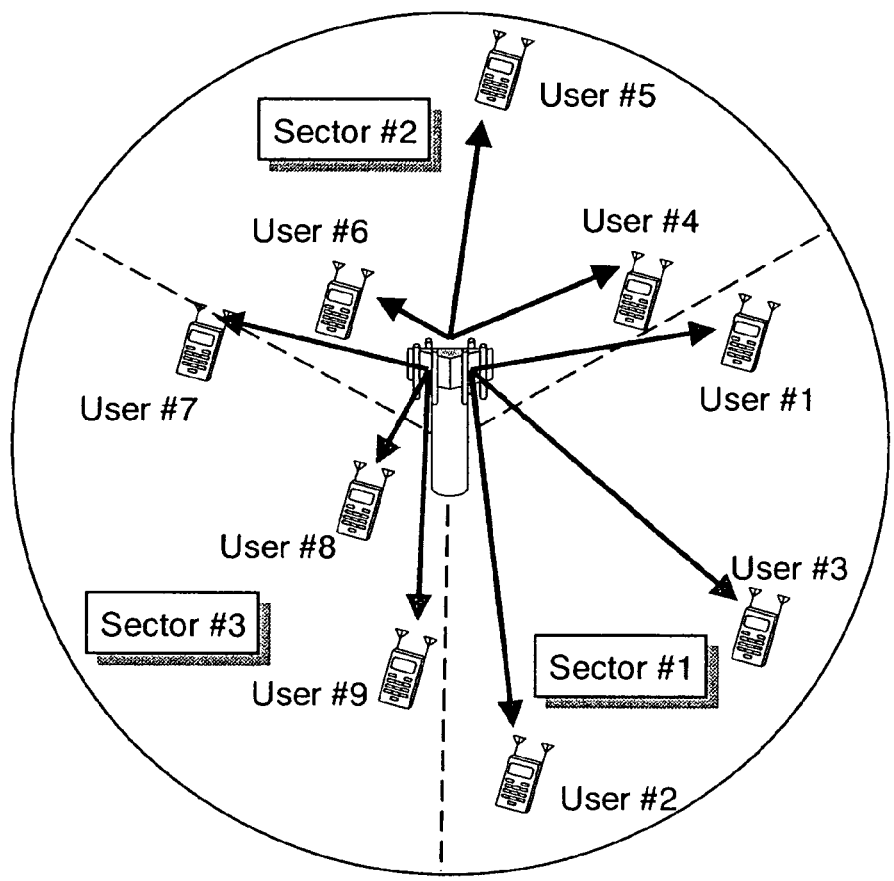
FIG. 12 is a diagram showing an example of a communication system to which a sector is applied instead of a cell (eleventh embodiment)

FIG. 12 is a diagram showing an example of the communication system to which sectors are applied instead of the cells. In the example shown in FIG. 12, a circular communication area centered on a base transceiver station B is equally divided into three sub-areas, and defined as a sector #1, a sector #2, and a sector #3, respectively (three-sector configuration).

The base transceiver station B has a communication slot (a time slot in this example) for each of the sectors, and assigns the respective time slots to the terminals (users) that are positioned in the respective sectors to conduct a communication. The base transceiver B has a plurality of antennas each having directivity. In FIG. 12, the User #1 to the User #3 are positioned in the sector #1, the User #4 to the User #6 are positioned in the sector #2, and the User #7 to the User #9 are positioned in the sector #3. The respective User #1 to User #9 receive a desired signal from the base transceiver station as well as a signal that is transmitted toward the adjacent sector as the interference signal.

In the eleventh embodiment, the terminals that are located in the vicinity of the boundary of the sectors are paired. In this case, the User #1 is paired with the User #4, the User #6 is paired with the User #7, and the User #2 is paired with the User #9, respectively, and the time slot at the same time is assigned to the respective terminals of the pair.

In an example shown in FIG. 12, the User #1 and the User #4 are assigned to the slots #1 of the sector #1 and the sector #2, the User #2 and the User #9 are assigned to the slots #2 of the sector #1 and the sector #3, and the User #6 and the User #7 are assigned to the slots #3 of the sector #2 and the sector #3. The slot assignment as shown in FIG. 12 is performed on the User #3, the User #5, and the User #8 because the interference component from the adjacent sectors is small in the amount.

The determination of the pair and the assignment of the slot are conducted by the base transceiver station B. That is, the base transceiver station B receives the report described in the fifth embodiment from the respective terminals, and the base transceiver station B performs the judgment based on the report, the determination of the pair, and the determination of the slot No., which are executed by the RNC of the fifth embodiment. In addition, the base transceiver station B determines the number of transmitting antennas in each of the sectors in the slot, and the modulation system as the occasion demands, and notifies the respective terminals of the determined number of transmitting antennas and the determined modulation system.

When the user (terminal) assignment with respect to the slot is conducted between the cells, the RNC (FIG. 8) is required. On the contrary, according to the eleventh embodiment, because the base transceiver station B has a function that is executed by the RNC, no RNC is required. For that reason, there is no delay between the RNC and the BTS in the eleventh embodiment.

Twelfth Embodiment

Subsequently, a twelfth embodiment of the present invention will be described. As the twelfth embodiment, a description will be given of a wireless base transceiver station device that is applied to a communication system in which the number of transmitting antennas and the modulation system with respect to the communication slot as described in the first to fourth embodiments are predetermined.

Figure 13:
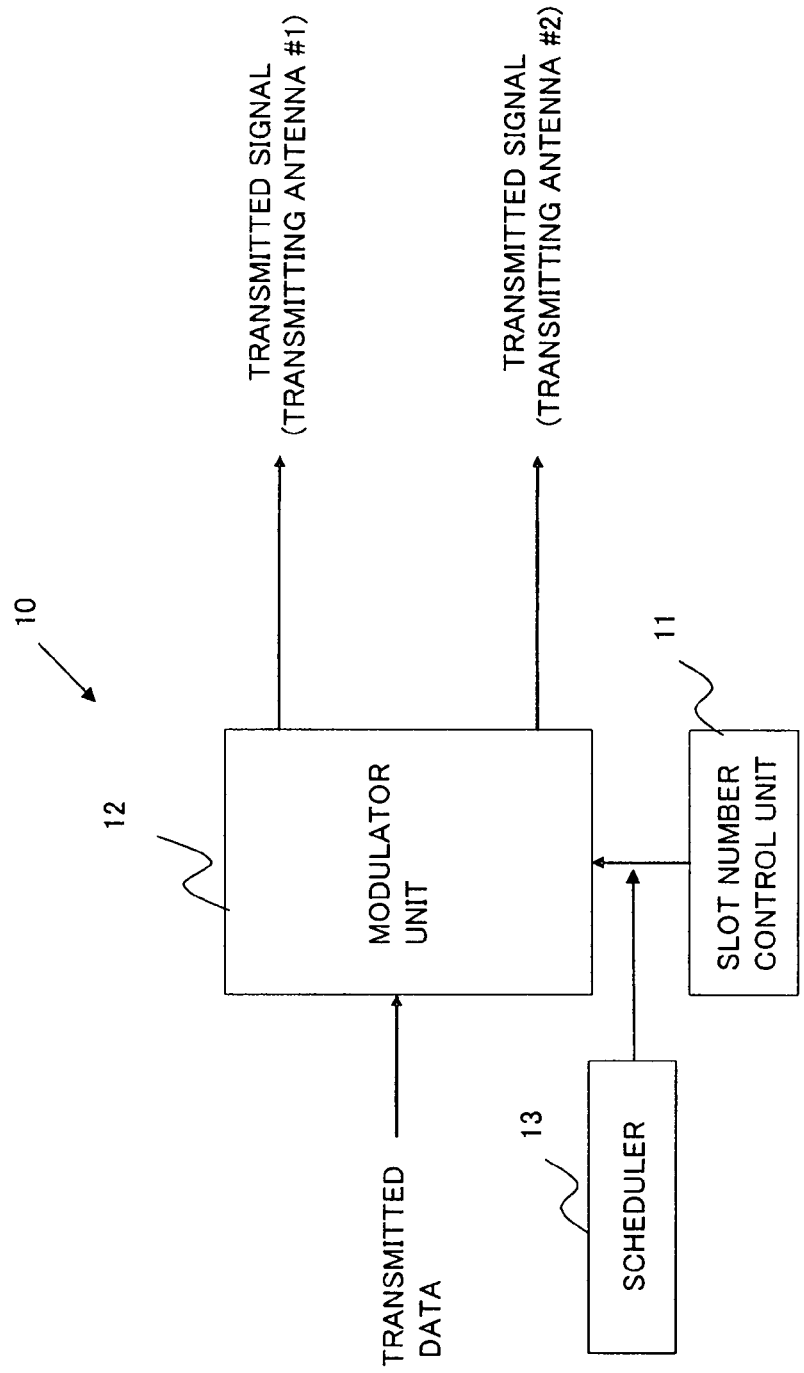
FIG. 13 is a diagram showing a structural example of a wireless base transceiver station device according to a twelfth embodiment.

FIG. 13 is a diagram showing a structural example of the wireless base transceiver station device in the twelfth embodiment. In FIG. 13, there is shown a wireless base transceiver station device 10 having two transmitting antennas (not shown). The wireless base transceiver station device 10 includes a slot number control unit 11, a modulator unit 12, and a scheduler 13.

The scheduler 13 assigns the time slot to the terminal that communicates with the wireless base transceiver station device 10. The scheduler 13 notifies the slot number control unit 11 of the slot assignment result (slot assignment information) and the present slot number.

The slot number control unit 11 has a storage area (not shown) that stores a correspondence of information (slot No.) on the plurality of communication slots which are used for transmission to the terminal and parameters (the number of transmitting antennas and the modulation system) which are predetermined with respect to the respective slot Nos. therein. The slot number control unit 11 reads information indicative of the number of corresponding transmitting antennas and the corresponding modulation system from the storage area at a timing (transmission timing) corresponding to the slot No., and sets the number of transmitting antennas and the modulation system in the modulator unit 12.

The modulator unit 12 conducts modulation on the inputted transmitted data through the modulation system that is set by the slot number control unit 11, generates the transmitted signal, and outputs the transmitted signal to the transmitting antennas corresponding to the set number of transmitting antennas.

For example, the number of transmitting antennas "1" and the modulation system "QPSK" are defined with respect to the communication slot No. #1 (Slot #1) in advance, and are stored in a recording area of the slot number control unit 11 in advance. After that, when the slot number control unit 11 recognizes that the present time slot is the Slot #1 through the notification from the scheduler 13, the slot number control unit 11 reports to the modulator unit 12 that the number of applied antennas is "1", and the modulation system is "QPSK". The modulator unit 12 modulates the transmitted data according to the report, and changes over the number of transmitting antennas for transmitting the transmitted signal.

Thirteenth Embodiment

Subsequently, a thirteenth embodiment of the present invention will be described. As the thirteenth embodiment, a description will be given of a wireless base transceiver station device in the case where the number of transmitting antennas and the modulation system to be used in a certain communication slot are adaptively controlled (according to the terminal) as described in the fifth embodiment.

Figure 14:
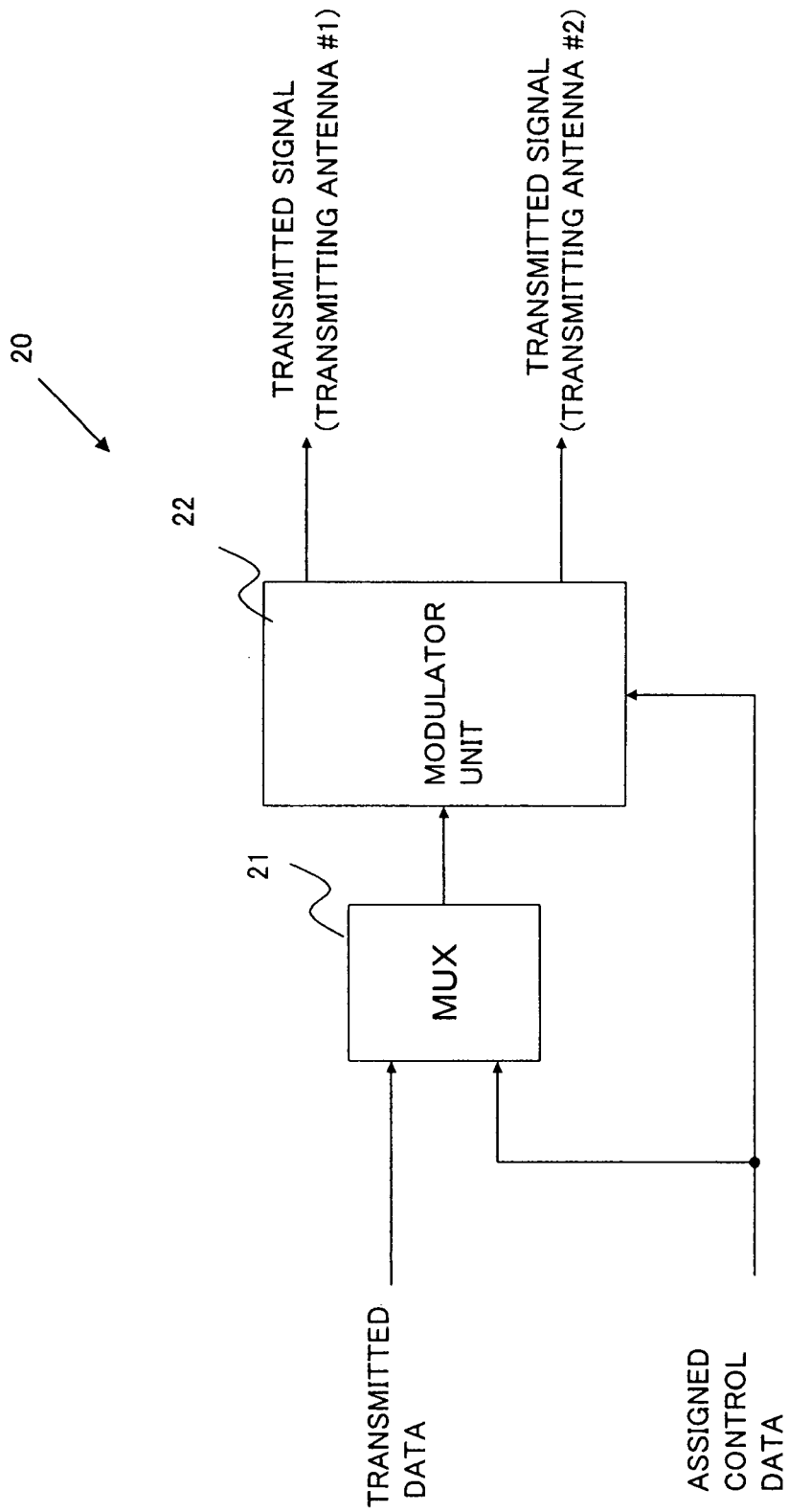
FIG. 14 is a diagram showing a structural example of a wireless base transceiver station device according to a thirteenth embodiment.

FIG. 14 is a diagram showing a structural example of the wireless base transceiver station device in the thirteenth embodiment. Referring to FIG. 14, the wireless base transceiver station device 20 includes a multiplexer unit (MUX) 21 and a modulator unit 22.

The wireless base transceiver station device 20 is different from the wireless base transceiver station device 10 according to the twelfth embodiment in that the wireless base transceiver station device 20 receives the parameters of the number of transmitting antennas and the modulation system which are inputted to the modulator unit 22, for example, as an instruction from the RNC (FIG. 8).

Referring to FIG. 14, "assignment control data" that is inputted to the MUX 21 and the modulator unit 22 is information that is received from, for example, the RNC, which includes information indicating whether assignment so as to reduce the slot No., the number of transmitting antennas, the modulation system, and the interference, which are assigned to the respective terminals, is conducted or not.

The MUX 21 multiplexes (for example, TDM, FDM, or the combination thereof) transmitted data (data channel) to be inputted and the assignment control data (control channel). The modulator unit 22 assigns the respective terminals to the communication slots according to the assignment control data, modulates the multiplex data from the MUX 21 according to the instructed modulation system, and transmits the transmitted signal through the transmitting antennas of the instructed number (changes over the number of transmitting antennas).

Fourteenth Embodiment

Figure 15:
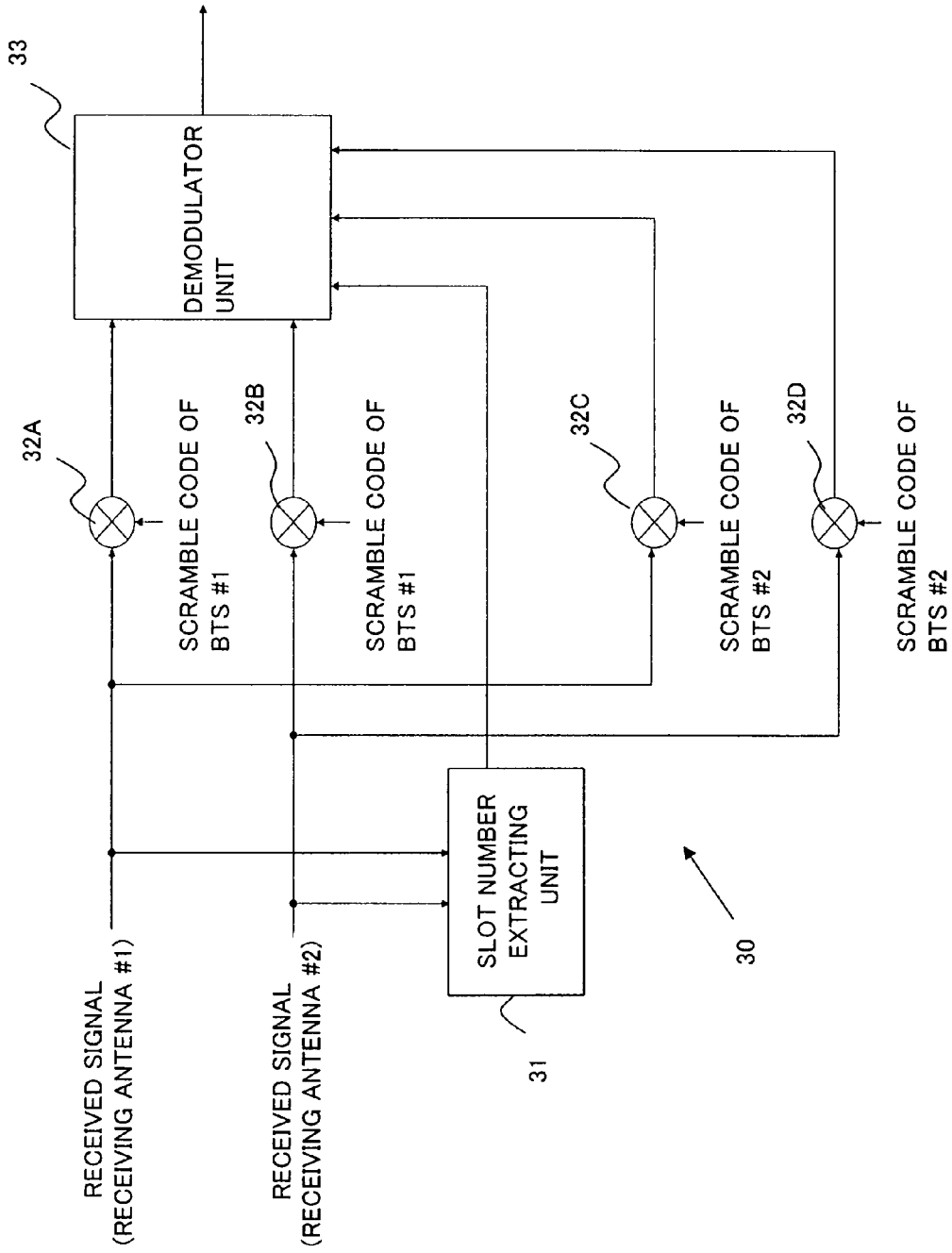
FIG. 15 is a diagram showing a structural example of a wireless terminal device according to a fourteenth embodiment.

Subsequently, a fourteenth embodiment of the present invention will be described. As the fourteenth embodiment, a description will be given of a wireless terminal device in the communication system described in the first to fourth embodiments. FIG. 15 is a diagram showing a structural example of the wireless terminal device in the fourteenth embodiment.

Referring to FIG. 15, a wireless terminal device 30 (terminal 30) includes two receiving antennas #1 and #2, a slot number extractor unit 31, multipliers 32A, 32B, 32C, and 32D, and demodulator 33. The terminal 30 is so structured as to correspond to the base station 10 (FIG. 13) described in the twelfth embodiment. Hereinafter, a description will be given of a structure in which the terminal 30 demodulates a received signal that is received through the SIMO communication of the communication base transceiver station (BTS #1) with the adjacent base transceiver station (BTS #2) with reference to FIG. 15.

The slot number extractor unit 31 establishes synchronization with the BTS #1 by means of the received signal from the BTS #1, and grasps the communication slot No. which is assigned to the subject terminal (notified from the BTS #1). When the slot number extractor unit 31 knows the communication slot No., the slot number extractor unit 31 specifies the number of transmitting antennas and the modulation system corresponding to the communication slot No. from a format (stored in the storage area) corresponding to the scramble code (known) of the BTS #1, and sets the specified number of transmitting antennas and the specified modulation system in the demodulator unit 33. Also, the slot number extractor unit 31 obtains the number of transmitting antennas and the modulation system of the BTS #2 corresponding to the communication slot No. from the format corresponding to the scramble code (known) of the BTS #2, and sets the obtained number of transmitting antennas and the obtained modulation system in the demodulator unit 33.

A scramble code of the communication base transceiver station (BTS #1) is inputted to the multipliers 32A and 32B whereas a scramble code of the adjacent base transceiver station (BTS #2) is inputted to the multipliers 32C and 32D. Signals that are transmitted from the BTS #1 and the BTS #2 (scrambled by the scramble code as in a W-CDMA system) are received by two receiving antennas as received signals, and then inputted to the respective multipliers 32A, 32B, 32C, and 32D.

The multipliers 32A and 32B descramble the received signals from the respective receiving antennas by using the scramble code of the BTS #1, and input the results to the demodulator unit 33. As a result, the received signal from the BTS #1 is inputted to the demodulator unit 33. The multipliers 32C and 32D descramble the received signals from the respective receiving antennas by using the scramble code of the BTS #2, and input the results to the demodulator unit 33. As a result, the received signal from the BTS #2 is inputted to the demodulator unit 33.

The demodulator unit 33 demodulates the received signals with respect to four inputted propagation paths. The demodulator unit 33 has four propagation path estimating devices (channel estimating units), calculates the propagation path estimated value from pilot channels that are included in the respective received signals, and demodulates data by using the calculated propagation path estimated value. The modulation system is considered in the demodulating process. As described above, the received signal from the BTS #2 corresponding to the interference signal is demodulated. The demodulator unit 33 is capable of removing the interference component (signal component from the BTS #2) which is included in the received signal from the BTS #1 on the basis of the demodulated signal. As a result of the demodulating process, data received from the BTS #1 with high accuracy can be outputted.

Fifteenth Embodiment

Subsequently, the fifth embodiment of the present invention will be described. As the fifteenth embodiment, a description will be given of a wireless terminal device that is applied in a case where the communication slot assignment is adaptively controlled as described in a fifteenth embodiment.

In the system which is described in the fifth embodiment, the respective terminals are assigned to the respective communication slots on the basis of the control information which is received from the RNC by the respective base stations. For that reason, the terminal receives the number of transmitting antennas, the modulation system, and information that assignment has been performed for the purpose of reducing the interference as the control information (assignment control data) from the base transceiver station. In the fifteenth embodiment, a wireless terminal device that receives the control information will be described.

Also, in the system described in the fifth embodiment, it is necessary to grasp the environment of the terminal at the base transceiver station side. For that reason, a description will be given of a wireless terminal device in which the terminal measures the interference electric power of the adjacent base transceiver station, and transmits the measured information to the communication base transceiver station.

Figure 16:
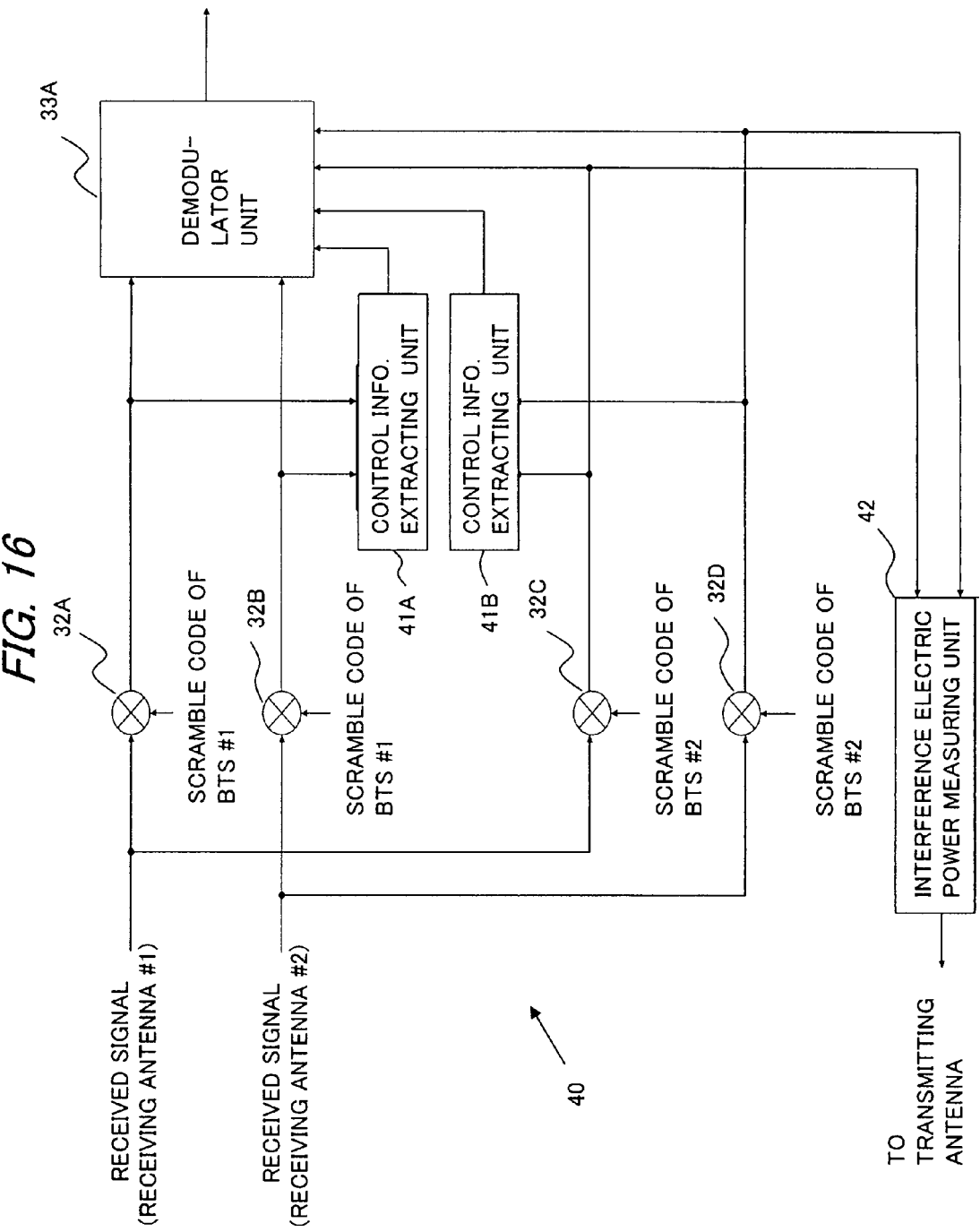
FIG. 16 is a diagram showing a structural example of a wireless terminal device according to a fifteenth embodiment.

FIG. 16 is a diagram showing a structural example of the wireless terminal device in the fifteenth embodiment. In FIG. 16, the wireless terminal device 40 (terminal 40) is so structured as to correspond the base transceiver station 20 (FIG. 14) described in the thirteenth embodiment. Hereinafter, a description will be given of a structure in which the terminal 40 demodulates the received signal that is received through the SIMO communication from the communication base transceiver station (BTS #1) and the adjacent base transceiver station (BTS #2) with reference to FIG. 16. The same configurations as those of the terminal 30 described in the fourteenth embodiment are denoted by identical symbols.

Referring to FIG. 16, a terminal 40 includes multipliers 32A, 32B, 32C, and 32D, control information extractor units 41A and 41B, a demodulator unit 33A, and an interference electric power measuring unit 42. The received signals from the BTS #1 and the BTS #2 which are received by the receiving antennas #1 and #2 are inputted to the respective multipliers 32A, 32B, 32C, and 32D. In the respective multipliers 32, the respective signals of the BTS #1 and the BTS #2 are extracted through the descramble process using the scramble code of the BTS #1 or the BTS #2, and then inputted to the demodulator unit 33A.

In this case, the signals of the BTS #1 which are outputted from the multipliers 32A and 32B are inputted to the control information extractor unit 41A, and the signals of the BTS #2 which are outputted from the multipliers 32C and 32D are inputted to the control information extractor unit 42A.

The control information extractor unit 41A extracts the control channel from the signal of the BTS #1, and obtains the assignment control data (control information) through the demodulation of the control channel. The control information extractor unit 41A inputs the control information (that is, the modulation system and the number of transmitting antennas of the BTS #1, and information indicating whether assignment has been conducted for the purpose of reducing the interference or not) to the demodulator unit 33A. The control information extractor unit 41B conducts the same processing as that of the control information extractor unit 41A on the signal from the BTS #2, and inputs the control information obtained as the processing result to the demodulator unit 33A.

The demodulator unit 33A conducts the demodulating process according to the modulation system or the number of transmitting antennas of the respective BTSs on the basis of the control information that is inputted from the control information extractor units 41A and 41B. In this case, it is possible to remove the interference component that is included in the signal of the BTS #1 through the demodulating process of the signal of the BTS #2.

Also, the output signals of the multipliers 32C and 32D are inputted to the interference electric power measuring unit 42 and the electric power level is measured. The measurement results are transmitted to the BTS #1 from the transmitting antenna (not shown) of the terminal 40 as the interference signal electric power.

Sixteenth Embodiment

Figure 17:
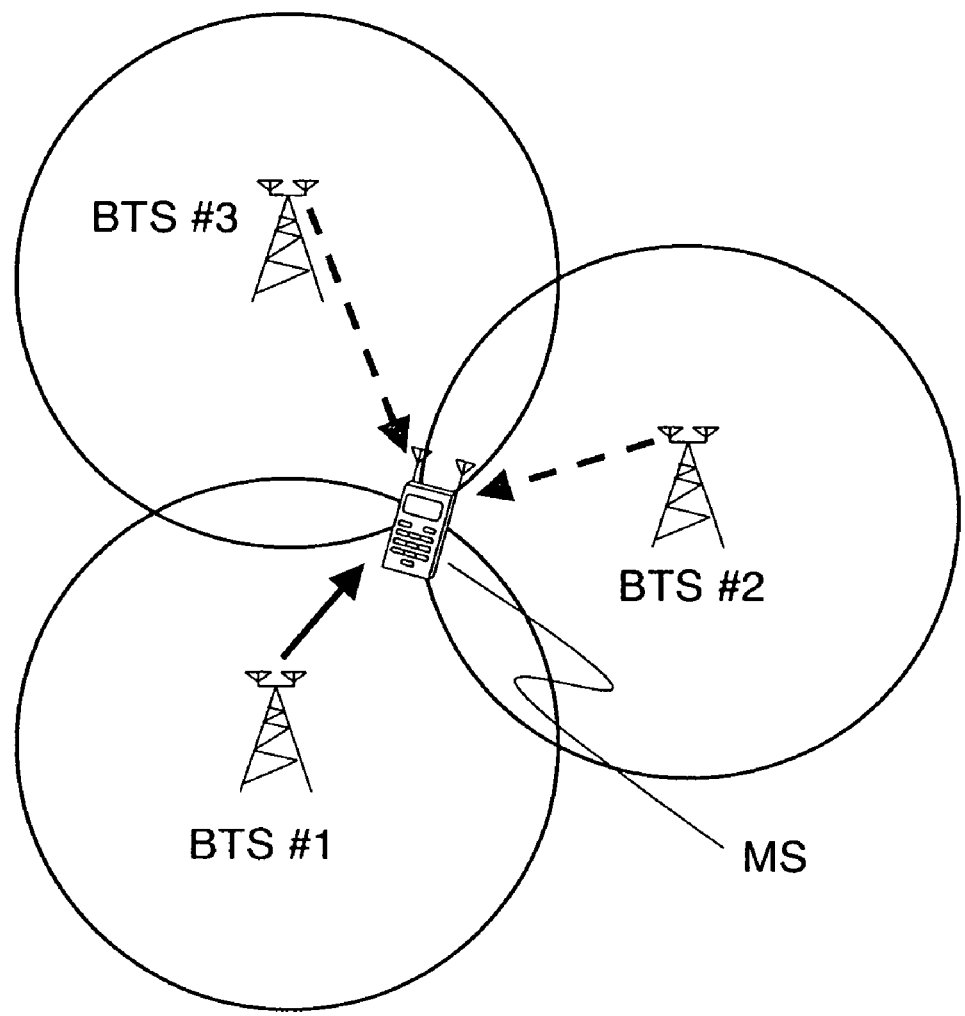
FIG. 17 is an explanatory diagram showing a communication system according to a sixteenth embodiment.

Subsequently, a sixteenth embodiment of the present invention will be described. FIG. 17 is an explanatory diagram showing a communication system according to the sixteenth embodiment. In the communication system shown in FIG. 17, three base transceiver stations (BTS #1, BTS #2, BTS #3) are adjacent to each other, and the cells of those BTSs are overlapped with each other.

The respective BTSs are capable of conducting the 2×2 MIMO communications with a terminal under the control of the respective stations. In FIG. 17, the terminal (MS) communicates with the BTS #1, and each of the BTS #1 to BTS #3 uses one transmitting antenna in the slot that is assigned to the MS by using the manner described in the foregoing embodiments.

The MS has four propagation path estimating devices, and uses two of those propagation path estimating devices for demodulating the signal from the BTS #1. On the other hand, the MS is capable of using the remaining two propagation path estimating devices for demodulating a signal from one of the BTS #2 and the BTS #3. In this example, the MS needs to determine which signal is to be used for the propagation path estimation. In the sixteenth embodiment, a description will be given of the MS having a function of determining the interference signal (the transmitting base transceiver station of the interference signal) to be used for the propagation path estimation in the case where the interference signal from the plurality of adjacent base transceiver stations is received.

Figure 18:
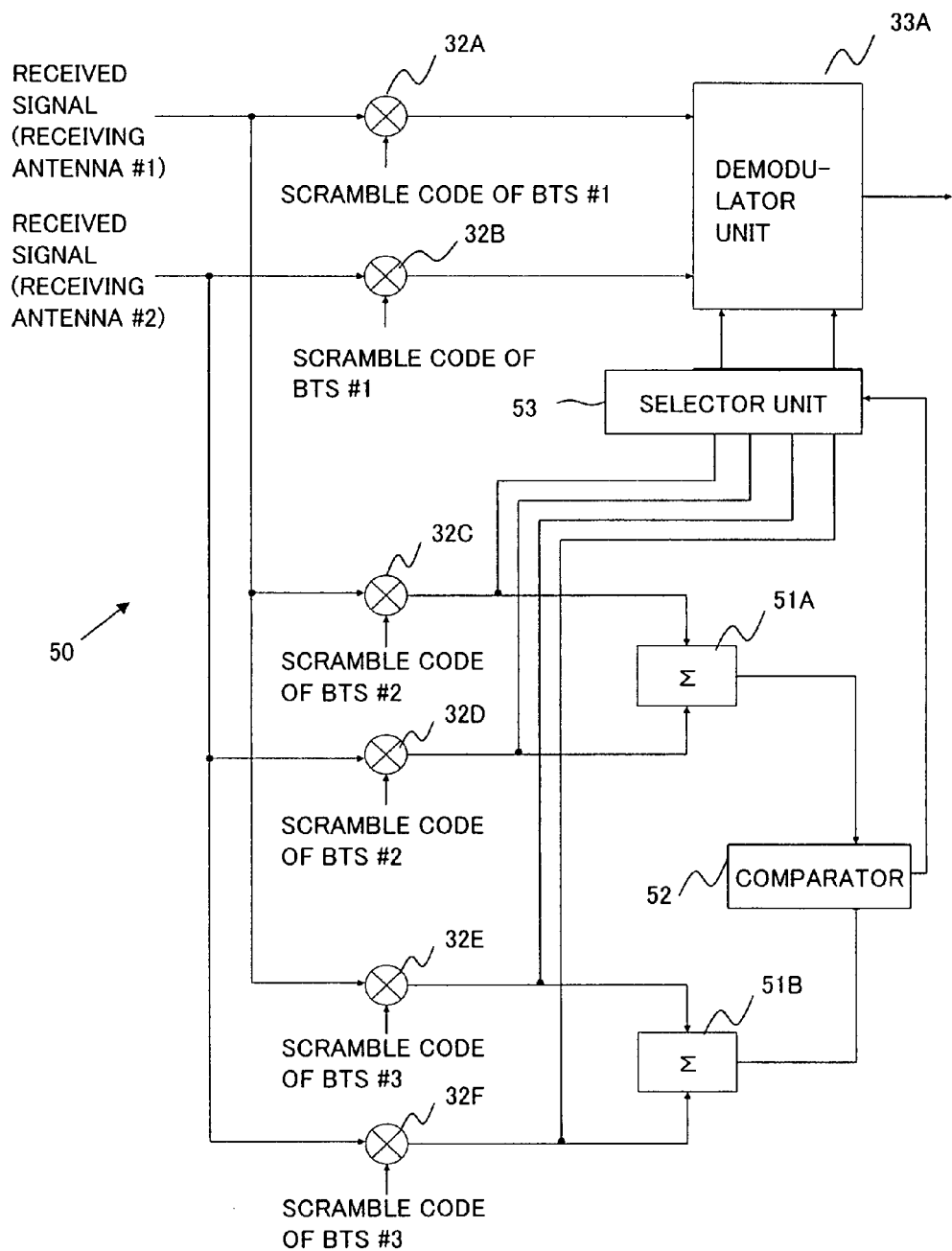
FIG. 18 is a diagram showing a structural example of a wireless terminal device (MS) according to a sixteenth embodiment.

FIG. 18 is a diagram showing a structural example of the wireless terminal device (MS) according to the sixteenth embodiment. An MS 50 shown in FIG. 18 measures the received electric powers of the BTS #2 and the BTS #3, and demodulates a signal addressed to the subject BTS (signal of the BTS #1) by using the signal of the BTS which is large in electric power in the communication environment shown in FIG. 17.

Referring to FIG. 18, the received signals from the BTS #1 to the BTS #3 are scrambled by scramble codes inherent to the BTS. The signals that have been received by the two receiving antennas #1 and #2 are multiplied by the scramble codes corresponding to the BTS #1 to BTS #3 by the multipliers 32A to 32F, to thereby output the signals of the respective BTSs from the respective multipliers 32A to 32F. The signal from the BTS #2 is inputted to the electric power measuring unit 51A, and the signal from the BTS #3 is inputted to the electric power measuring unit 51B.

Each of the electric power measuring units 51A and 51B calculates an average value of the electric power level of the input signal (for example, a pilot signal), and inputs the calculated average value to a comparator unit 52 as the received electric power value of the adjacent base transceiver stations (BTS #2, BTS #3). The comparator unit 52 compares the inputted received electric power values with each other, and inputs information indicative of the larger electric power value to a selector unit 53. The output signals from the multipliers 32C, 32D, 32E, and 32F are inputted to the selector unit 53.

The selector unit 53 inputs the input signal that is larger in the received electric power value to the demodulator unit 33A according to the information from the comparator 52. For example, in the case where the received electric power from the BTS #2 is large, the signal from the BTS #2 is inputted to the demodulator unit 33A through the selector unit 53.

The demodulator unit 33A conducts the demodulation process by using the signal from the BTS #1 and the signal from the BTS #2 which is selected by the selector unit 53. As a result, it is possible to remove the signal component (interference component) of the BTS #2 with respect to the signal from the BTS #1.

In the example shown in FIG. 18, there are provided two electric power measuring units (electric power measuring units 51A and 51B) for measuring the received electric power of the adjacent base transceiver station. There can be provided two or more electric power measuring units with two or more MSs.

In the case of using the electric power measuring unit of M (M is larger than 2) adjacent base transceiver stations, the electric powers of the M adjacent base transceiver stations are not always measured, but the electric powers of L adjacent base transceiver stations in which L is smaller than M can be measured. As a method of reducing the number of adjacent base transceiver stations from M to L, for example, there can be applied a configuration in which the terminal (MS) periodically searches the M adjacent base transceiver stations, and selects the L adjacent base transceiver stations from the M adjacent base transceiver stations in the order that is larger in the received electric power value. Alternatively, it is possible to adopt a configuration that selects the adjacent base transceiver station having the received electric power value that is equal to or larger than a certain threshold value from the M adjacent base transceiver stations.

Seventeenth Embodiment

Subsequently, a seventeenth embodiment of the present invention will be described. In the seventeenth embodiment, a description will be given of the detailed configuration of the wireless terminal device described in the fourteenth embodiment and the fifteenth embodiment.

<Basic Configuration>

Figure 19:
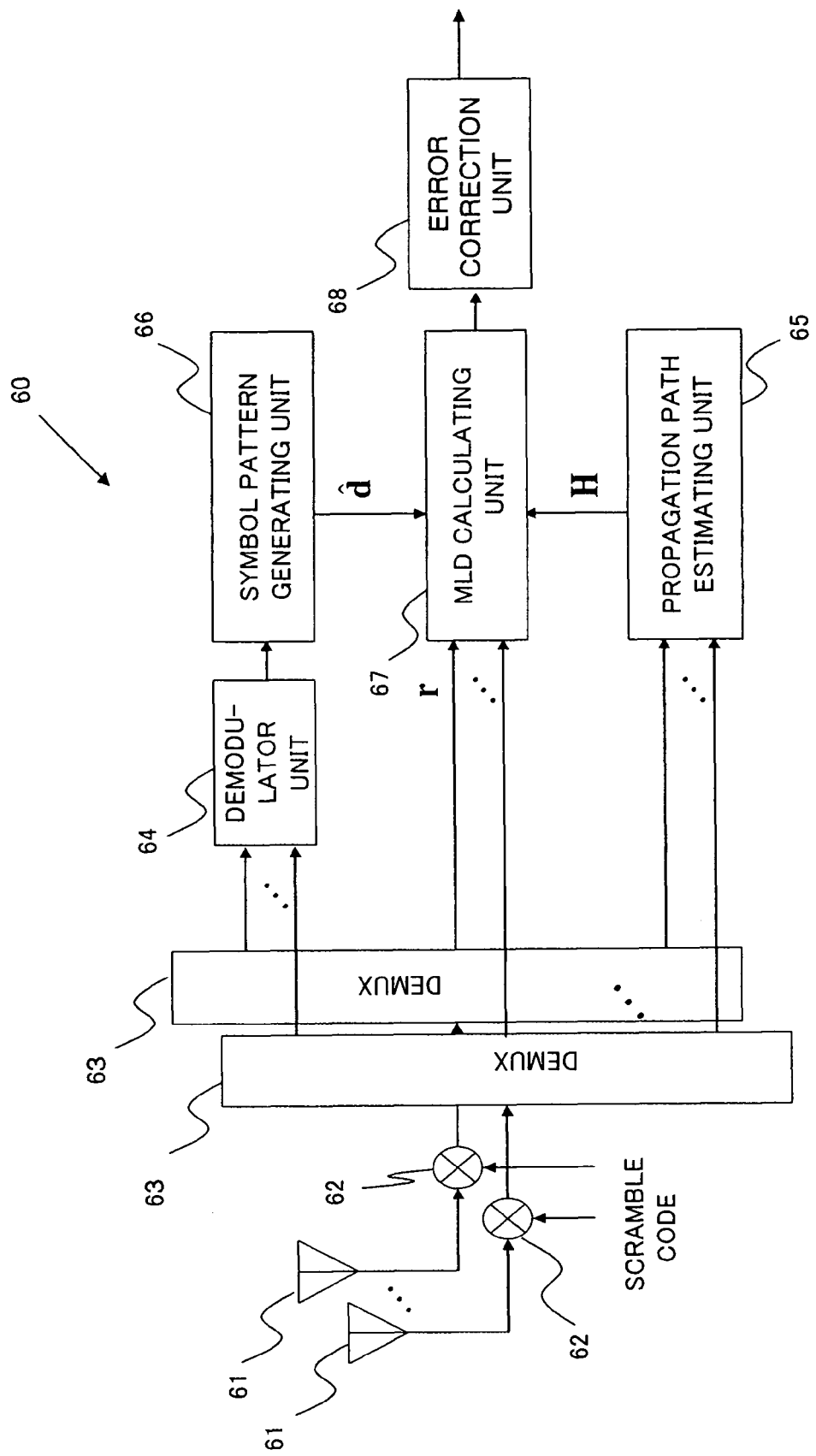
FIG. 19 is a diagram showing a structural example of a wireless terminal device according to a seventeenth embodiment.

FIG. 19 shows a structural example of the wireless terminal device according to the seventeenth embodiment. In FIG. 19, there is shown the basic configuration of the wireless terminal device. Referring to FIG. 19, a wireless terminal device 60 (terminal 60) includes a plurality of (N) receiving antennas 61, and a plurality of multipliers 62 and a plurality of demultiplexer units (DEMUX: demultiplexer) 63 which are prepared according to the respective receiving antennas 61. In addition, the terminal 60 includes a plurality of control channel demodulator units 64 and propagation path estimating units (channel estimating units) 65 which are prepared according to a plurality of demultiplexer units 63, a symbol pattern generating unit 66, a plurality of maximum likelihood detection (MLD) calculating units 67, and an error correcting unit 68.

The terminal 60 demultiplexes the signal that have been received in the plurality of receiving antennas 61 into a plurality of channels by the respective demultiplexer units 63. In this example, the signal is demultiplexed into a control channel, a data channel, and a pilot channel, the signal of the control channel is inputted to the control channel demodulator unit 64, the signal of the data channel is inputted to the MLD calculating unit 67 as a received signal vector [r] (hereinafter the vector is indicated by the brackets [ ]), and the signal of the pilot channel is inputted to the propagation path estimator unit 65. The control channel demodulator unit 64 demodulates the signal of the control channel to obtain the assignment control data (control information) included in the signal. The control information includes the modulation system of the data channel and the number of transmitting antennas. The control information and a signal indicative of the base transceiver station that transmits the control information are inputted to the symbol pattern generating unit 66, and the symbol pattern generating unit 66 generates a symbol pattern ([D]: "[d^]" of FIG. 19) of the transmitted signal, and inputs the symbol pattern to the MLD calculating unit 67.

The propagation path estimating unit 65 conducts propagation path estimation on the respective components of the channel matrix [H] by using the pilot channel that is received by the respective receiving antennas 61, generates the channel matrix [H], and inputs the channel matrix [H] to the MLD calculating unit 67.

The MLD calculating unit 67 conducts calculation on the basis of the maximum likelihood detection method (MLD) by using the data channel (received signal vector [r]), the channel matrix [H] that is obtained from the propagation path estimating unit 65, and the symbol pattern [D] of the transmitted signal which is obtained by the symbol pattern generating unit 64, to find a transmitted signal vector [d]. The MLD calculating unit 67 delivers the transmitted signal vector [d] to the error correcting unit 68. The error correcting unit 68 conducts the error correction and obtains data that has been transmitted from the base transceiver station.

As described in the first embodiment, in the case where the configuration of the communication slot is fixed, it is possible to know in advance the number of transmitting antennas and the modulation system in the symbol pattern generating unit 66. In this case, the demodulating process using the control channel demodulating unit 64 can be omitted.

Also, a description is given of a case where the MLD is applied as an example of the MIMO demodulating method in the configuration of the terminal 60. However, the present invention can be applied to not only the MLD but also the MIMO decode system such as MMSE or ZF. It should be noted that the decode method can be MMSE or ZF in a process of demodulating a signal of another base transceiver station (interference base transceiver station) and canceling the signal.

<Detailed Configuration>

In the case where the communication slot configuration of the base transceiver station is predetermined, and the communication slot configurations of the respective base transceiver stations are different from each other (as in the case of the first embodiment), it is necessary that the terminal grasp the slot configuration of the base transceiver station that receives the signal. In the description of the first and the thirteenth embodiments, the communication slot configurations of the base transceiver station are made to correspond to the scramble code Nos., thereby making it possible that the terminal grasps the communication slot configuration of the respective base transceiver stations.

Figure 20:
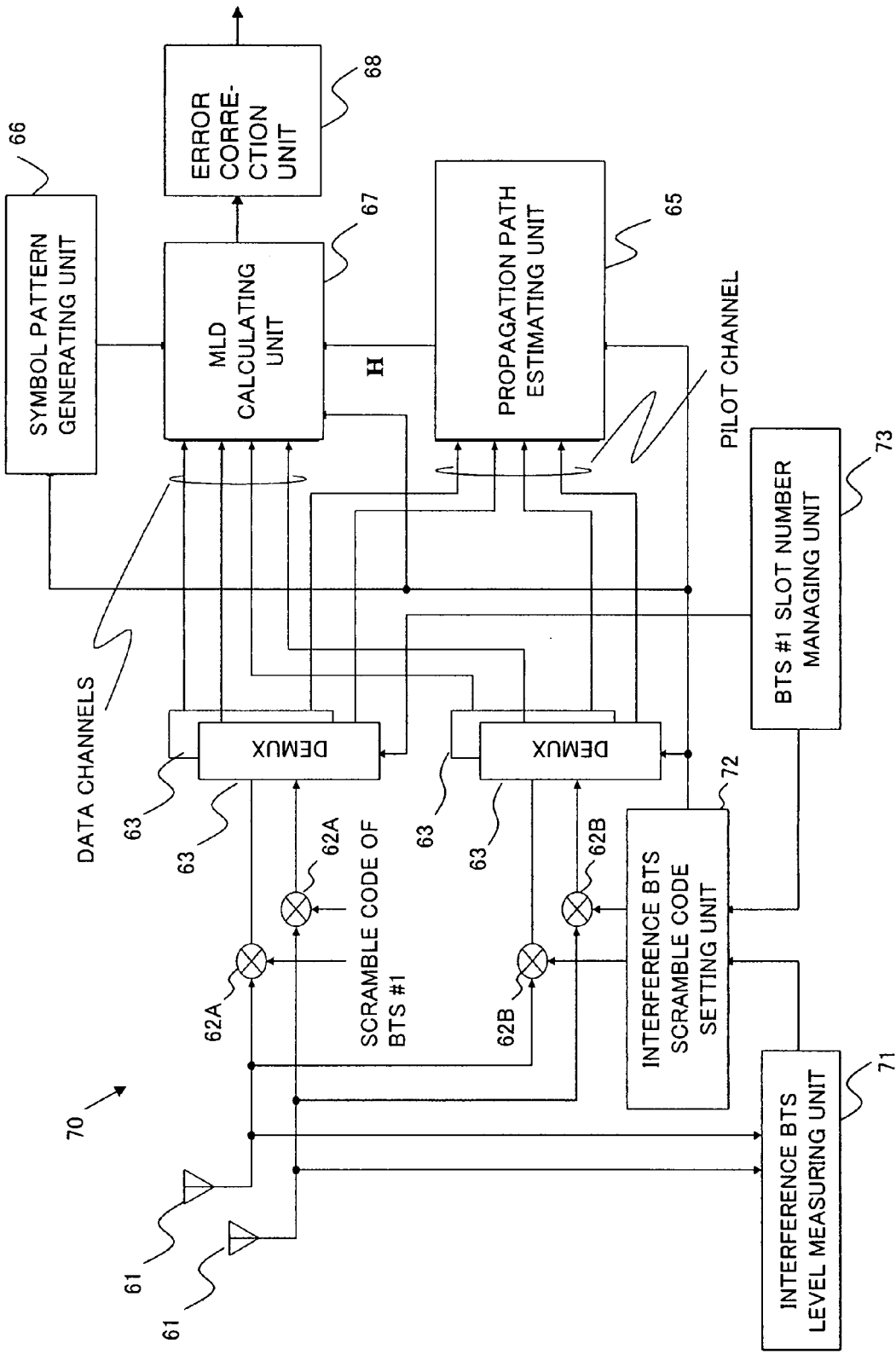
FIG. 20 is a diagram showing a specific structural example of a wireless terminal device according to a seventeenth embodiment.

FIG. 20 is a diagram showing a specific structural example of the wireless terminal device. Referring to FIG. 20, a wireless terminal device 70 (terminal 70) has the same functional configuration as those of the terminal 60 shown in FIG. 19, and those structural elements are denoted by identical symbols. The terminal 70 has two receiving antennas 61, and is capable of performing the 2×2 MIMO receptions. Then, it is assumed that the terminal 70 communicates with the BTS #1 as the communication base transceiver station.

The terminal 70 further includes two multipliers 62A that multiply the scramble code of the communication base transceiver station, two multipliers 62B that multiply one scramble code of the interference base transceiver station, a plurality of demultiplexer units (DEMUX) 63 that are disposed in correspondence with the multipliers 62A and 62B, a propagation path estimating unit 65, a symbol pattern generating unit 66, an MLD calculating unit 67, and an error correcting unit 68. Those configurations are identical with those of the terminal 60 (FIG. 19) except that there is provided no control channel demodulator unit 64.

The terminal 70 has only the configuration of conducting the demodulating process of the signal from four propagation paths because the terminal 70 performs the 2×2 MIMO reception. The propagation path estimating unit 65 is so configured as to calculate the channel matrix [H] with respect to the four propagation paths. In other words, there are provided four propagation path estimating devices.

The terminal 70 further includes an interference base transceiver station level measuring unit 71, an interference base transceiver station scramble code setting unit 72, and a BTS #1 (communication base transceiver station) slot number managing unit 73. The terminal 70 is different from the terminal 60 in this configuration.

Figure 21:
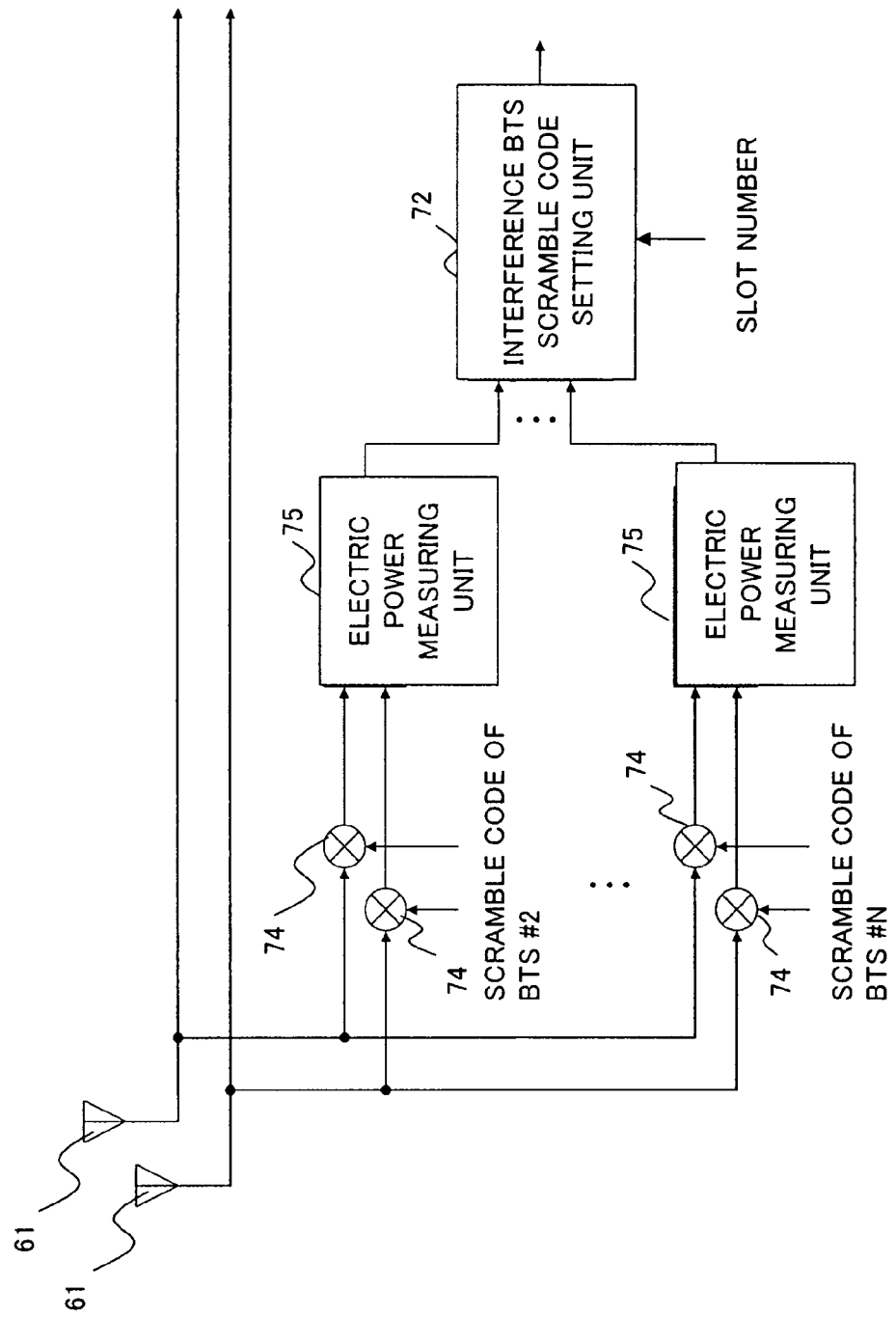
FIG. 21 is a diagram showing a structural example of an interference base transceiver station level measuring unit shown in FIG. 20.

The interference base transceiver station level measuring unit 71 is capable of measuring the receiving level of the plurality of interference base transceiver stations (BTS #2 to BTS #N) which are received by the two receiving antennas 61. FIG. 21 is a diagram showing the structural example of the level measuring unit 71.

The level measuring unit 71 includes a plurality of multipliers 74 for multiplying the signals that have been received by the two receiving antennas 61 by the scramble codes of the plurality of interference base transceiver stations (BTS #2 to BTS #N), and (N−1) electric power measuring units 75 that are disposed in the interference base transceiver station unit. The scramble codes of the BTS #2 to BTS #N are multiplied (descrambled) by the signals that have been received by the two receiving antennas 61 through the multiplier 74. As a result, the signal components of the respective interference base transceiver stations to be measured in the electric power level are extracted. The extracted signal components are inputted to the corresponding electric power measuring unit 75.

The electric power measuring unit 75 measures the received electric power (electric power level) of the signal components which are inputted from the respective multipliers 74, and outputs the average value of the measured value as the interference base transceiver station electric power value. As a result, the interference base transceiver station electric power values from the plurality of interference base transceiver stations are delivered to the interference base transceiver station scramble code setting unit 72. The interference base transceiver station electric power values are delivered to the interference base transceiver station scramble code setting unit 72 together with the identification information (scramble code No.) of the interference base transceiver station.

Also, the slot managing unit 73 that manages the present slot No. delivers information such as the number of transmitting antennas with respect to the present slot to the interference base transceiver station scramble code setting unit 72. It should be noted that the slot managing unit 73 manages parameters such as the slot No. of the BTS #1 and the number of transmitting antenna corresponding to the slot No. because the slot managing unit 73 communicates with the BTS #1 of FIG. 20

The interference base transceiver station scramble code setting unit 72 (hereinafter referred to as "setting unit 72") determines whether the interference component of the signal (desired signal) from the BTS #1 can be removed or not. In the case where the interference can be removed, the interference base transceiver station scramble code setting unit 72 sets the scramble code No. of the interference base transceiver station that is capable of removing the most interference components (largest in the interference base transceiver station electric power). With this configuration, the setting unit 72 outputs the scramble code (scramble code of the interference base transceiver station) of the set scramble code number to the two multipliers 62B.

The setting unit 72 has a correspondence table (which is stored in the storage area within the setting unit 72) of the scramble code numbers. and the communication slot numbers. When the scramble code No. is inputted to the setting unit 72, the setting unit 72 retrieves the number of transmitting antennas and the modulation system of the interference base transceiver station corresponding to the scramble code No. from the correspondence table.

When the setting unit 72 sets the scramble code No., the setting unit 72 searches the correspondence table by the scramble code No. to retrieve the number of transmitting antennas and the modulation system (control information) of the corresponding interference base transceiver station. The setting unit delivers the control information to the interference base transceiver station demultiplexer units 63, the symbol pattern generating unit 66, and the propagation path estimating section 65. As a result, the terminal 70 is capable of demodulating the signal of the communication base transceiver station (BTS #1) and the signal of one selected interference base transceiver station.

In the case where the setting unit 72 receives from the slot number managing unit 73 information that the number of transmitting antennas of the BTS #1 is 2, the setting unit 72 recognizes that the propagation path from the interference base transceiver station cannot be estimated, and instructs the respective processing blocks (the symbol pattern generating unit 66, the propagation path estimating unit 65) so as to demodulate only the signal of the BTS #1. In this case, the setting unit 72 inputs the scramble code of the BTS #1 to the two multipliers 62B.

Also, there is a case where the setting unit 72 determines that it is unnecessary to estimate the propagation path of the interference signal because the electric power value of the interference signal is very small, even if the number of transmitting antennas of the BTS #1 is 1. In this case, the setting unit 72 notifies the respective processing blocks (the symbol pattern generating unit 66, the propagation path estimating unit 65) of the information that the interference component is not demodulated. In this case, the multipliers 62B and the demultiplexer units 63 for the interference signal demodulation are not used.

The example shown in FIG. 20 is a terminal structural example in the case where the communication slot structures in the respective BTSs are fixed. However, in the system in which the number of transmitting antennas and the modulation system are adaptively controlled as in the fifth embodiment, the terminal 70 has the control channel demodulator unit 64 shown in the terminal 60, and demodulates the control channels from the BTS #1 to BTS #N, thereby obtaining the control information.

Also, in the case where the BTS #1 transmits information that "scheduling has been conducted so as to reduce the interference component of the BTS #2" as information that is included in the control information, and the terminal 70 acquires the information from the control channel of the BTS #1, the terminal 70 demodulates the control information of the BTS #2, and notifies the respective processing blocks of the number of transmitting antennas and the modulation system of the BTS #1 and the BTS #2, thereby making it possible to demodulate the data. Therefore, in this case, it is necessary to demodulate only the control channels of the BTS #1 and the BTS #2. In addition, when the number of transmitting antennas and the modulation system are identical between the BTS #1 and the BTS #2, the terminal 70 is capable of demodulating the control information of the BTS #1, thereby making it possible to obtain the control information of the BTS #2.

Eighteenth Embodiment

Subsequently, an eighteenth embodiment of the present invention will be described. As the eighteenth embodiment, a description will be given in more detail of the communication system according to the fifth embodiment as shown in FIG. 8.

<Configuration of RNC>

Figure 22:
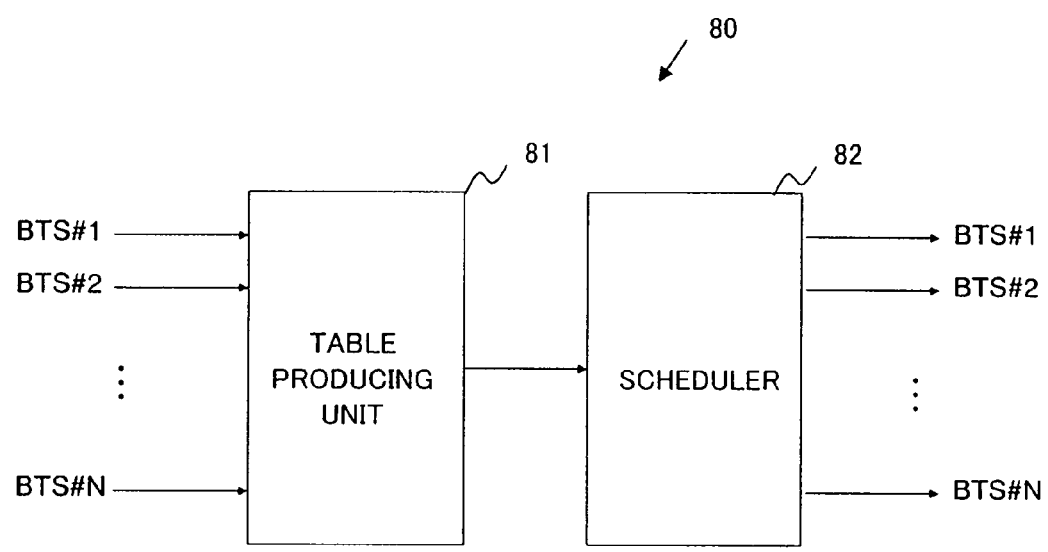
FIG. 22 is a diagram showing a structural example of a base transceiver station control device (RNC) (eighteenth embodiment)

The radio network controller (RNC) schedules the terminal assignment of the respective base transceiver stations to the communication slots on the basis of the information of the interference base transceiver stations at the respective users (terminals: MS) which are reported from the plurality of base transceiver stations. FIG. 22 shows a structural example of the RNC. In FIG. 22, the RNC 80 communicates with the N BTSs (BTS #1 to BTS #N). The RNC 80 includes a table producing unit 81 and a scheduler 82.

The RNC 80 receives information (a signal that is transmitted in the procedure (2) shown in FIG. 8) such as the interfering base transceiver station in the MS with which the respective BTSs communicate from the BTS #1 to BTS #N. The table producing unit 81 produces a table 83 shown in FIG. 23 on the basis of the received information.

As shown in FIG. 23, for example, the number of antennas provided in each of the users (MS), the communicating BTS, the number of transmitting antennas provided in the communicating BTS, the interfering base station, and the amount of interference of the interfering base station are stored in the table 83. Only one interference BTS is stored in the table 83. It is also possible to register the information on those interference BTSs in the table 83 in the case where information on a plurality of interference BTSs is included in the report that is notified the RNC of from the MS.

The RNC 80 is capable of grasping the interference statuses of the respective MSs by means of the table producing unit 81. The scheduler 82 schedules how the user assignment is conducted in each of the BTSs by using the information that is stored in the table 83.

For example, in the case where the amounts of interference "X" and "Y" are approximately the same in the table 83, the MS #1 and the MS #2 have the mutual communication base transceiver stations as the interfering stations, and the amount of interference are approximately the same. In this case, the scheduler 82 conducts scheduling so as to assign those two users (MS #1 and MS #2) to the same communication slot between the BTS #1 and the BTS #2 which are the communication base transceiver stations.

The results scheduled by the scheduler 82 are notified the respective BTS #1 to BTS #N of from the RNC 80 as the control information (assignment control data). The notification contents include "user No. (identification information of the terminal)", "communication slot No.", "the number of transmitting antennas", and "the modulation system". For example, the RNC 80 assigns the MS #1 to the communication Slot #i (#i is slot No.) of the BTS #1, and transmits the control information that the modulation system is set to "QPSK", and the number of transmitting antennas is set to "1" to the BTS #1. Also, the RNC 80 assigns the MS #2 to the communication Slot #i (a slot at the same timing that is synchronous with the communication Slot #i of the BTS #1) 2, and transmits the control information that the modulation system is set to "QPSK", and the number of transmitting antennas is set to "1" to the BTS #2. In this way, the scheduler 80 conducts scheduling so that the communication environments shown in FIG. 2 are established in the MS #1 and the MS #2.

The BTS #1 and the BTS #2 transmit a communication signal to the MS #1 and the MS #2 according to the control information from the RNC 80.

<Configuration of BTS>

Figure 24:
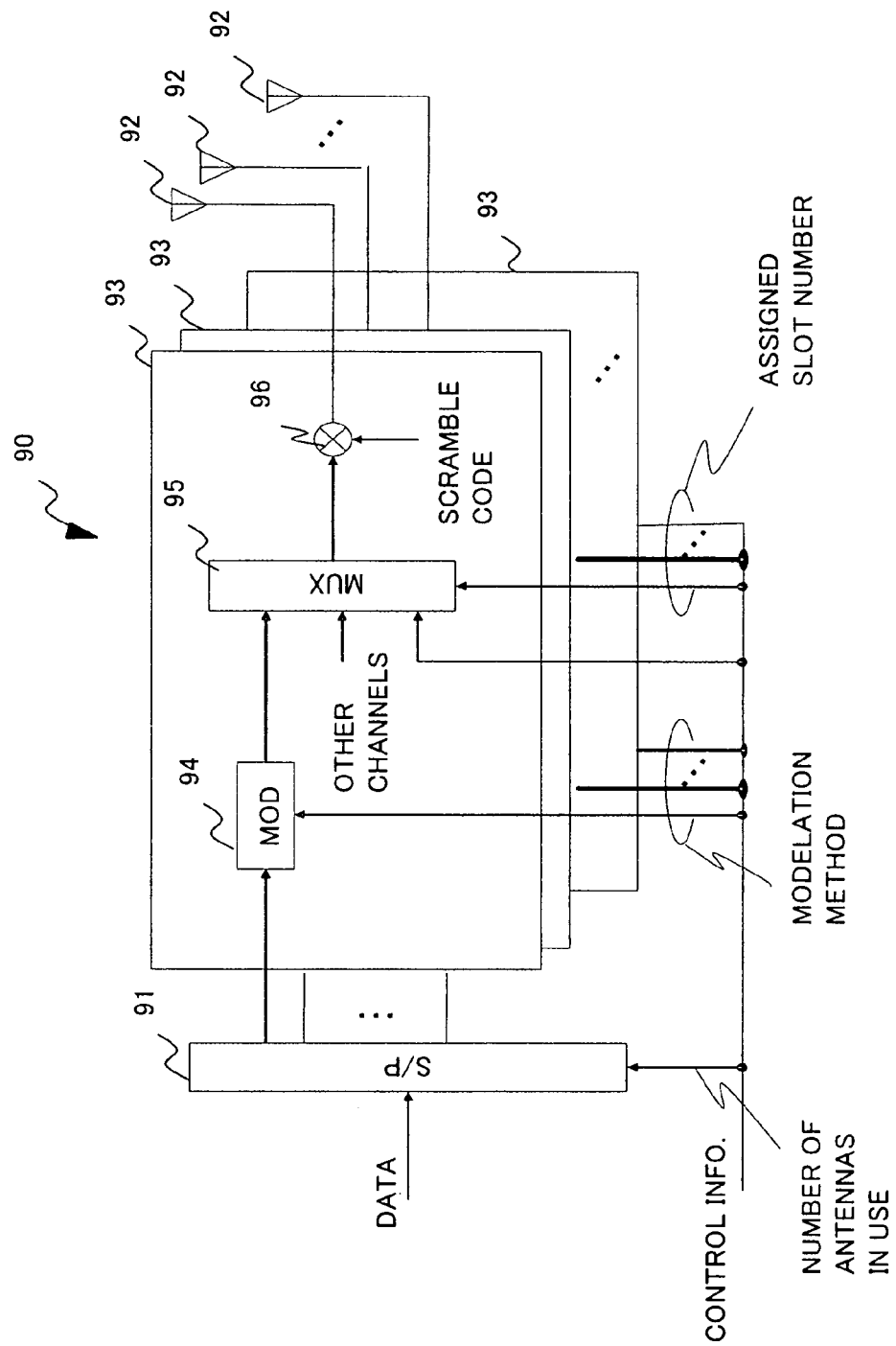
FIG. 24 is a diagram showing a structural example of a base transceiver station (BTS) according to an eighteenth embodiment.

FIG. 24 is a diagram showing the structural example of the base transceiver station (BTS) 90 which is applicable as the BTS #1 to BTS #N in the description of the RNC 80. Referring to FIG. 24, the BTS 90 receives data to be transmitted to the respective users (terminals) and information (control information) that is instructed from the RNC 80. A serial to parallel converter (S/P) 91 parallelizes data by the number of transmitting antennas. The parallelized number is controlled according to the number of transmitting antennas in each of the communication slots which is included in the control information from the RNC 90.

The BTS 90 has transmitted signal generating units 93 of the same number as that of the transmitting antennas 92, which are connected to the S/P 91 and the plurality of transmitting antennas 92. In the transmitted signal generating unit 93, data is modulated by a modulator unit (MOD unit) 94 through the modulation system such as QPSK which is instructed from the RNC 80. Subsequently, the data (data channel) is multiplexed with another channel (for example, the pilot channel) or the control channel by means of a multiplexer unit (MUX) 95.

In this case, the multiplexer unit 95 assigns the data (multiplexed signal) to the communication slot which is instructed from the RNC 80 with reference to the communication slot assignment information (assignment slot No.). Also, the control information such as the assignment slot No. which is instructed from the RNC is transmitted by using the control channel.

In this example, in the case where the RNC reports information as to whether scheduling that can reduce the interference component has been conducted or not, as described in the fifth embodiment, to the BTS, the information is also mapped on the control channel as with the information such as the slot No., and multiplexed with the data, and then transmitted.

The multiplexed signal (transmitted signal) which is outputted from the multiplexer unit 95 is subjected to scramble with the use of a scramble code inherent to the BTS by the multiplier 96, and thereafter transmitted from the transmitting antenna 92.

<Sequence>

Figure 25:
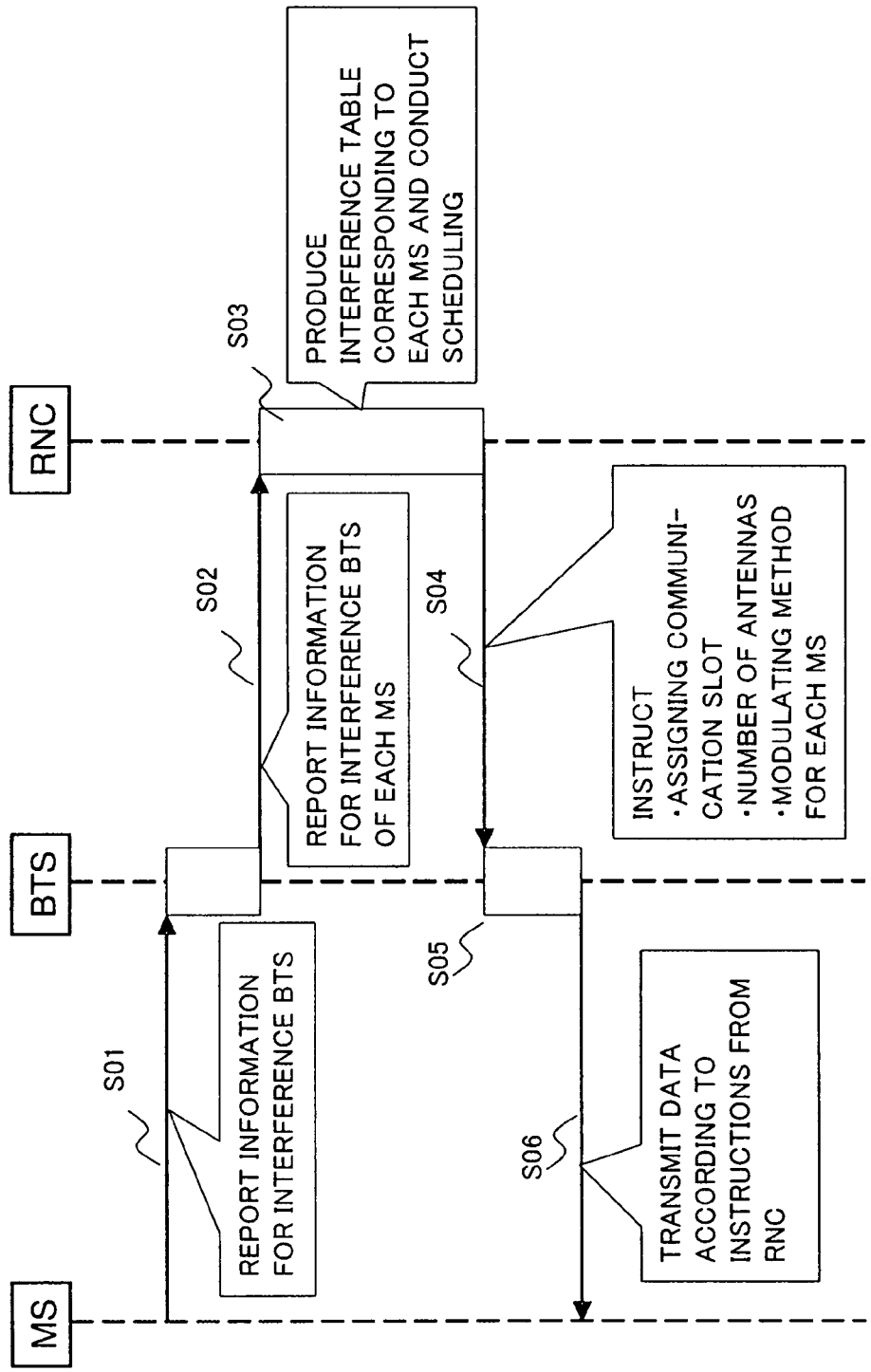
FIG. 25 is a sequence diagram showing the eighteenth embodiment.

FIG. 25 is a diagram showing a sequence in the case where data is transmitted to the MS by using the RNC and the BTS shown in FIGS. 22 to 24 in the communication system shown in FIG. 8. Referring to FIG. 25, each of the MSs transmits the interference information (interference status) to the communicating BTS (S01). In the BTS, since the interference status is reported from the plurality of MSs, all of those reports are transferred to the RNC (S02).

In the RNC, the table shown in FIG. 23 is produced with respect to the respective MSs and scheduling is conducted by using the interference information that has been transferred from all of the BTSs under its own control as described above (S03). The instruction based on the scheduling result is transmitted to the respective BTSs (S04), the respective BTSs control a method of transmitting the data to the MS according to the instruction (S05), and the transmitted signal including data therein is transmitted to the MS (S06).

Nineteenth Embodiment

Figure 26:
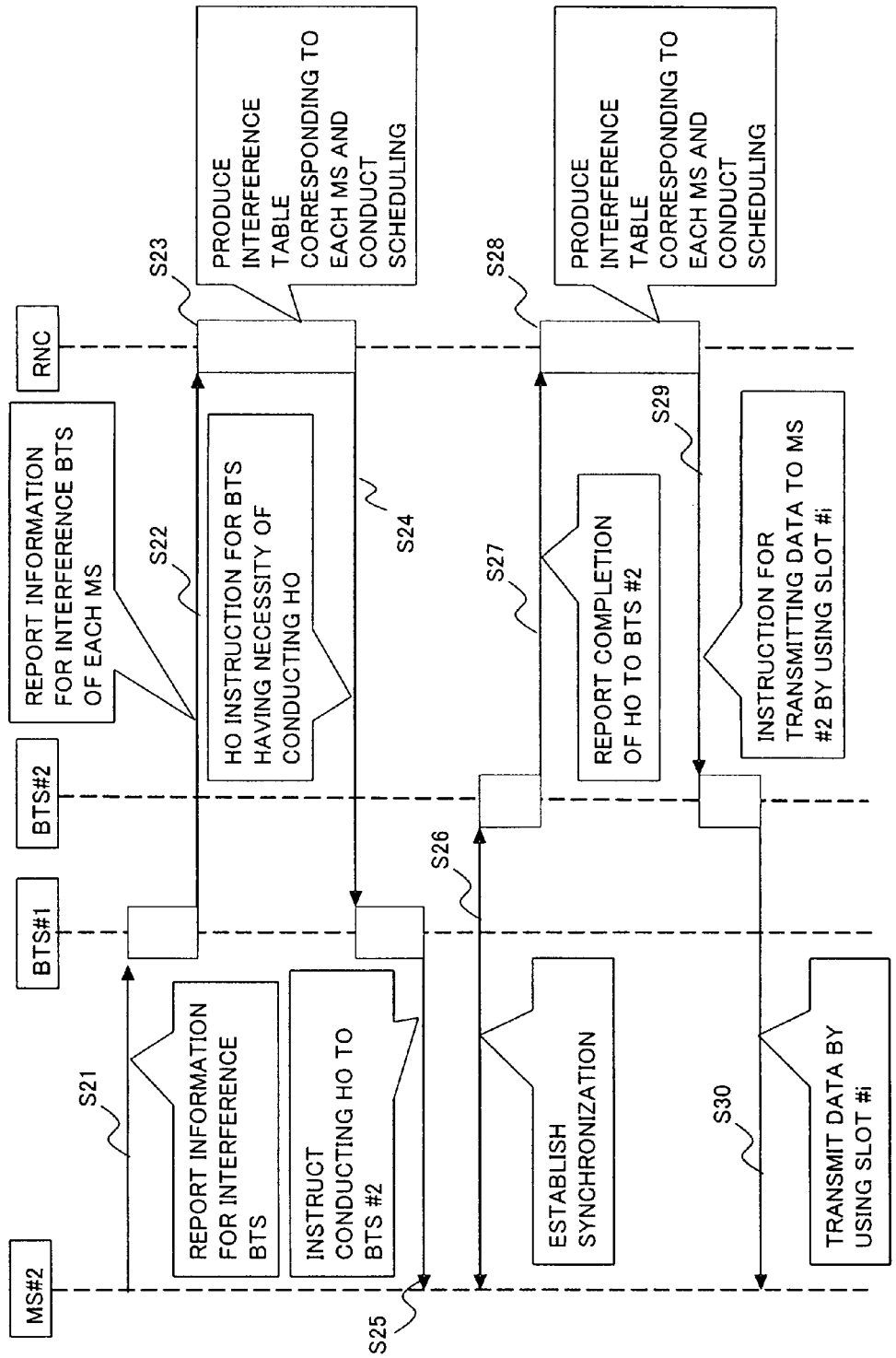
FIG. 26 is a diagram showing a sequence of handover (nineteenth embodiment)

Subsequently, a nineteenth embodiment of the present invention will be described. In the nineteenth embodiment, handover described in the tenth embodiment will be described. FIG. 26 is a sequence diagram at the time of hand over. The description of FIG. 26 is given in the assumption of the description of the tenth embodiment.

The MS #2 (User #2) transmits the interference information to the communication base transceiver station (S21). The communication base transceiver station (BTS #1) that has received the interference information transfers the information to the RNC (S22). The RNC produces a table (interference table) for scheduling on the basis of the interference information, and conducts scheduling (S23). In this example, the RNC has a table producing unit and a scheduler as shown in FIG. 22.

Herein, it is assumed that a table shown in FIG. 27 is produced in the table producing unit, and the amount of interference "X" and the amount of interference "Y" in the MS #1 (User #1) and the MS #2 are substantially the same as each other. In this case, the RNC hands over (HO) any one of the MS #1 and the MS #2 to the BTS #2, and establishes the communication shown in FIG. 2 with respect to the respective MS #1 and MS #2.

Herein, in the case where the RNC determines that the MS #2 is handed over, the RNC instructs the BTS #1 to notify the MS #2 of the information (forcing HO instruction) that "hand over to the BTS #2" (S24). The BTS #1 transfers the forcing HO instruction to the MS #2 (S25). The MS #2 establishes synchronization between the MS #2 and the BTS #2 according to the forcing HO instruction, and conducts handover (S26). Upon completion of the handover, the BTS #2 reports the RNC that handover has been performed to the BTS #2 by the MS #2 (S27).

Through the handover, the RNC can conduct scheduling for supplying the communication environments shown in FIG. 2 to the MS #2 and the MS #1 (S28). As a result of the scheduling, when it is determined that the MS #1 and the MS #2 communicate by the communication Slot #i of the same timing, the RNC notifies the BTS #1 and the BTS #2 of the control information including the slot No. #i (S29), and the BTS #1 and the BTS #2 transmit the transmitted signal including the data to the MS #1 and the MS #2 by the Slot #i according to an instruction (control information) from the RNC.

Twentieth Embodiment

Subsequently, a twentieth embodiment of the present invention will be described. In the first to nineteenth embodiments, a down link communication (communication from the BTS to the MS) is described. The present invention is applicable to an up link communication (communication from the MS to the BTS) like to the down communication.

In the case of the first embodiment, the communication slot of the up link is applied with a configuration in which the modulation system and the number of transmitting antennas are fixed according to the communication slot No.

Figure 28:
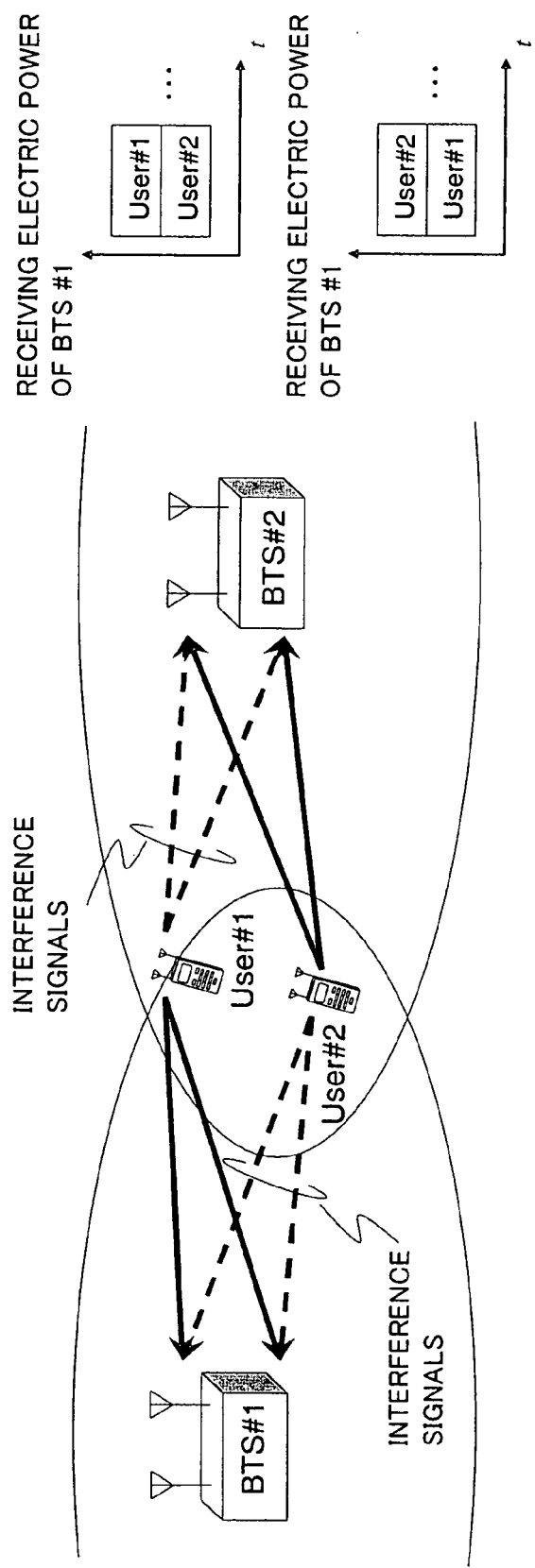
FIG. 28 is an explanatory diagram showing a twentieth embodiment.

On the other hand, in the case where the number of transmitting antennas and the modulation system with respect to the communication slot are variably configured (controllable) as in the fifth embodiment, the MSs on the cell boundary (User #1 and User #2 of FIG. 28) are paired, and the User #1 and the User #2 transmit a signal by using one transmitting antenna as shown in FIG. 28, thereby making it possible to reduce the interference component by the BTS #1 and the BTS #2 that are communication base transceiver stations of these users.

It is desirable to control the received electric powers and the receiving timings of the signals from the User #1 and the User #2 to be approximately the same, between the BTS #1 and the BTS #2. In this case, as a method of assigning the user (MS), there are proposed the following methods. For example, the signal electric power and the receiving timing of the respective users (MSs) which are received by the BTS #1 and the BTS #2 precede the BTS #1 and the BTS #2, and are reported to the RNC that controls the BTS #1 and the BTS #2. The RNC conducts the user assignment control (scheduling) so that the received electric power and the receiving timing are identical with each other, and the control information that is obtained by scheduling is notified the respective BTS #1 and BTS #2 of, and notified the User #1 and the User #2 of from the BTS #1 and the BTS #2, to thereby execute the up link communication according to the control information.

[Effects of the Embodiments]

Figure 29:
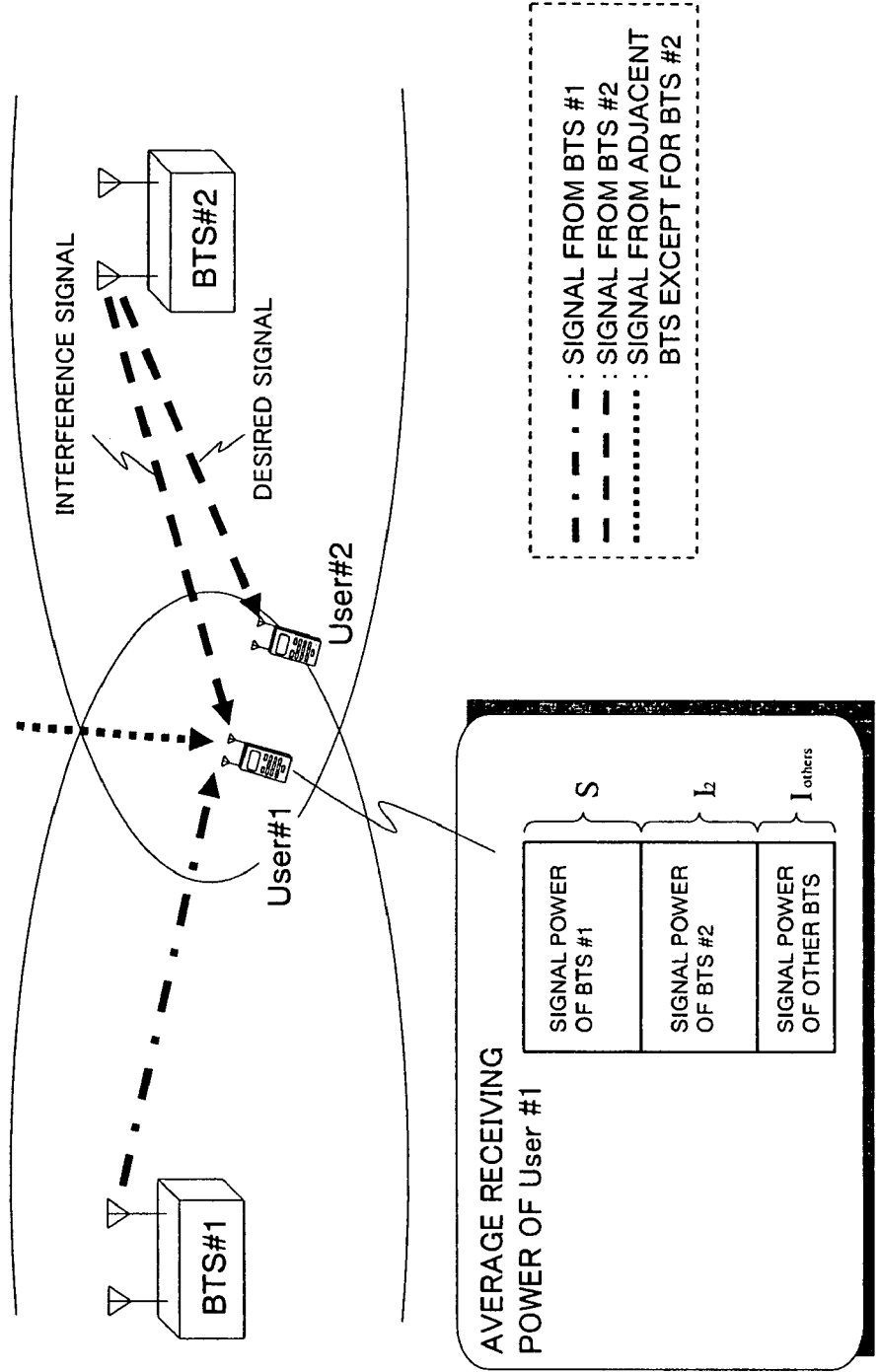
FIG. 29 is an explanatory diagram showing the communication environments in simulation for explaining effects of this embodiment.

The effects of the embodiments according to the present invention are measured through a computer simulation. The measurement environments will be described with reference to FIG. 29. In FIG. 29, the BTS #1 and the User #1 (MS #1) communicate with each other, and the BTS #2 and the User #2 (MS #2) communicate with each other. The User #1 is positioned at the cell boundary, and the BTS #1 and the BTS #2 transmit a signal by means of one transmitting antenna. Also, the User #1 and the User #2 use two receiving antennas for the signal reception.

The average received electric power of the User #1 is divided into "a desired signal electric power (S) from the BTS #1", "an interference signal electric power ($I_2$) from the BTS #2", and "an interface signal electric power ($I_{others}$) from the adjacent base transceiver station other than the BTS #2", as shown in FIG. 29. In order to simulate the cell boundary, $S=I_2$ is set.

Figure 30:
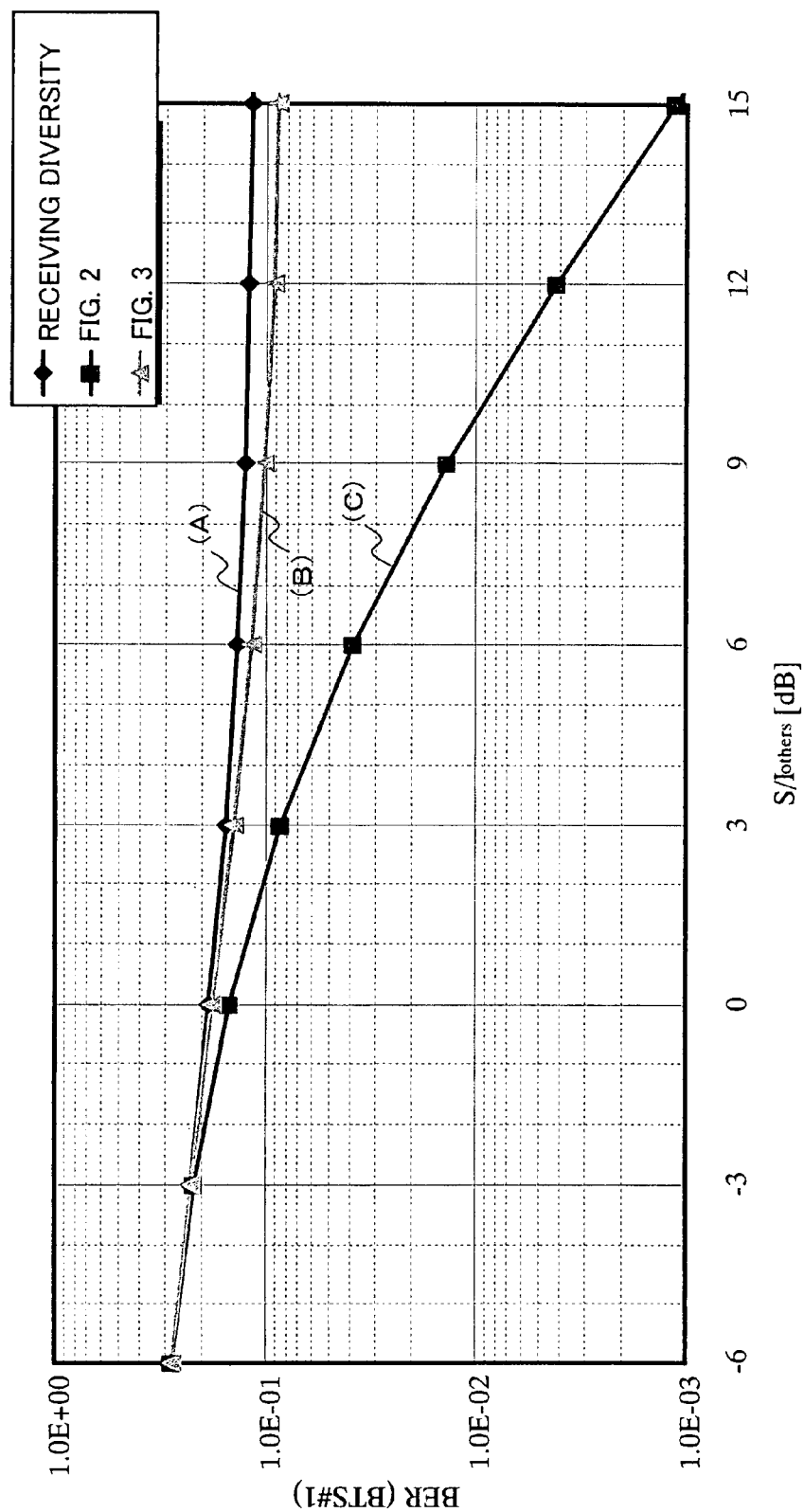
FIG. 30 is a diagram showing the simulation results in the simulation environments shown in FIG. 29.

FIG. 30 is a diagram showing a measurement result through the computer simulation in the case where $S/I_{others}$ is a parameter. Three lines within a graph of FIG. 30 correspond to (A) "two receiving diversities (the communication environments shown in FIG. 1)", (B) "the communication environments shown in FIG. 3", and (C) "the communication environments shown in FIG. 2".

A receiving diversity characteristic (shown by a line A) is the worst. A line (B) shows a case where the number of transmitting antennas of the BTS #1 is 1, and the number of transmitting antennas of the BTS #2 is 2 as shown in FIG. 3, which shows the result that the terminal demodulates one of the signal of the BTS #1 and a signal of the BTS #2.

A line (C) shows a case where both of the numbers of transmitting antennas in the BTS #1 and the BTS #2 are 1 as shown in FIG. 2. In this case, it is found that the receiving characteristic shown by the line (C) is excellent in the receiving characteristics shown by the lines (A) and (B). Therefore, it is found that the communication environments shown in FIG. 2 are ensured by using the configuration described in the embodiments, thereby making it possible to greatly improve the communication quality. For example, in the case where the interference signal electric power from the adjacent base transceiver station other than the BTS #2 and the desired signal electric power from the BTS #1 are identical with each other, that is, $S/I_{others}$ is equal to 0 [dB], it is found that the effect obtained by creating the communication environments shown in FIG. 2 according to the embodiment of the present invention has about 2 to 3 [dB].

[Others]

The above-described embodiments disclose the following inventions. The following inventions can be appropriately combined together as the occasion demands.

The disclosures of Japanese patent application No. JP2006-126538 filed on Apr. 28, 2006 including the specification, drawings and abstract are incorporated herein by reference.

What is claimed is:

1. A wireless receiving station that receives a signal from a first wireless transmitting station and a signal from a second wireless transmitting station which is different from the first wireless transmitting station in a case of receiving the signal from the first wireless transmitting station as a communication party of the wireless receiving station by a communication slot that is assigned to the wireless receiving station, the wireless receiving station, comprising:

a plurality of receiving antennas;

a demodulator unit that estimates a propagation path of at least one of a plurality of received signals which are received by the plurality of receiving antennas, and demodulates the plurality of received signals by using the estimation result; and a discriminating unit that discriminates a number of transmitting antennas to be used in the first wireless transmitting station in the communication slot which is assigned to the wireless receiving station, wherein in a case where a number of propagation paths that are generated between the first wireless transmitting station and the wireless receiving station, which is determined according to the number of transmitting antennas, is smaller than a number of propagation paths that can be estimated by the demodulator unit, the demodulator unit estimates the propagation path between the wireless receiving station and the first wireless transmitting station by using the signal from the first wireless transmitting station, estimates the propagation path between the wireless receiving station and the second wireless transmitting station by using the signal from the second wireless transmitting station, and estimate the signals that are transmitted from the first and second wireless transmitting stations by using the propagation path estimated values which are obtained from the propagation path estimations.

2. The wireless receiving station according to claim 1, further comprising a storage unit that stores a correspondence of a plurality of communication slots to be used in the first wireless transmitting station and the number of transmitting antennas to be used in the first wireless transmitting station in each of the plurality of communication slots, wherein the discriminating unit retrieves from the storage unit on the basis of identification information of the communication slot which is assigned to the wireless receiving station and identification information of the first wireless transmitting station, and determines the number of transmitting antennas to be used in the first wireless transmitting station.

3. The wireless receiving station according to claim 1, wherein the discriminating unit discriminates a modulation system of transmitted data to be used in the first wireless transmitting station by the communication slot that is assigned to the wireless receiving station, and wherein the demodulator unit conducts a demodulating process taking the discriminated modulation system into consideration.

4. The wireless receiving station according to claim 1, wherein a number of propagation paths which are generated between the wireless receiving station and the second wireless transmitting station in the communication slot of the first wireless transmitting station which is assigned to the wireless receiving station is equal to or smaller than a value obtained by subtracting the number of propagation paths of the signals between the first wireless transmitting station and the wireless receiving station from a number of propagation paths which can be estimated by the demodulator unit.

5. The wireless receiving station according to claim 1, wherein the communication slot in which the number of transmitting antennas to be used in the first wireless transmitting station is fixed are assigned to the wireless receiving station.

6. The wireless receiving station according to claim 5, wherein the number of transmitting antennas is fixed in a part of a plurality of communication slots assigned to the wireless receiving station.

7. The wireless receiving station according to claim 1, wherein the number of transmitting antennas to be used in the communication slot of the first wireless transmitting station which is assigned to the wireless receiving station is equal to the number of transmitting antennas to be used in the communication slot of the second wireless transmitting station that is used at a same timing of the communication slot of the first wireless transmitting station.

8. The wireless receiving station according to claim 1, wherein the wireless receiving station receives the number of transmitting antennas to be used in the communication slot that is assigned to the wireless receiving station.

9. The wireless receiving station according to claim 1, further comprising:
a measuring unit that measures received signals from the second wireless transmitting station, which are received by the plurality of receiving antennas; and
a unit to notify the first wireless transmitting station of a measurement result of the measuring unit,
wherein identification information of the communication slot that is assigned to the wireless receiving station which is determined according to the measurement result, and the number of transmitting antennas to be used in the communication slot are received from the first wireless transmitting station.

10. The wireless receiving station according to claim 9, wherein the number of transmitting antennas, which is determined such that a sum of the number of propagation paths which are generated between the wireless receiving station and the first wireless transmitting station and the number of propagation paths which are generated between the wireless receiving station and the second wireless transmitting station is equal to or smaller than a number of propagation paths that can be estimated by the demodulator unit, is received from the first wireless transmitting station.

11. The wireless receiving station according to claim 9, wherein the identification information of the communication slot in which a number of transmitting antennas is fixed is received from the first wireless transmitting station.

12. The wireless receiving station according to claim 9, wherein a number of transmitting antennas to be used in the communication slot which is specified by the identification information of the communication slot is equal to the number of transmitting antennas to be used in the communication slot of the second wireless transmitting station that is used at a same timing as that of the communication slot.

13. The wireless receiving station according to claim 9, wherein control information related to the demodulating process at the communication slot, whose contents are equal between the first wireless transmitting station and the second wireless transmitting station, is received from the first wireless transmitting station.

14. The wireless receiving station according to claim 9, wherein in the case where signals from a plurality of second wireless transmitting stations are received by the plurality of receiving antennas, received electric powers of each of the plurality of second wireless transmitting stations are measured, and at least the received electric power of the second wireless transmitting station which is largest in the received electric powers is notified to the first wireless transmitting station.

15. The wireless receiving station according to claim 1, further comprising a unit to hand over to the second wireless transmitting station according to an instruction from the first wireless transmitting station,
wherein in the case where handover is conducted, propagation paths that are smaller than the number of propagation paths which can be estimated by the demodulator unit are generated between the wireless receiving station and the first wireless transmitting station, and between the wireless receiving station and the second wireless transmitting station at the communication slot of the second wireless transmitting station which is assigned to the wireless receiving station.

16. The wireless receiving station according to claim 1, wherein signals are received from the first and second wireless transmitting stations which constitute a base transceiver station that transmits the signal to respective sectors in a communication area that is divided into a plurality of sectors.

17. A wireless transmitting station, comprising:
a plurality of transmitting antennas; and
a transmitting unit that transmits a signal by means of at least one of the plurality of transmitting antennas in a specified communication slot included in a plurality of communication slots, wherein a number of transmitting antennas, in the at least one of the plurality of transmitting antennas, to be used at a time of transmitting the signal in the specified communication slot is predetermined in consideration of interference from another wireless transmitting station, and the number of transmitting antennas, in the at least one of the plurality of transmitting antennas, is lower than a total of the plurality of transmitting antennas included in the wireless transmitting station.

18. The wireless transmitting station according to claim 17, wherein the plurality of communication slots include a plurality of specified communication slots, and the number of transmitting antennas to be used at the time of transmitting the signal in each of the plurality of specified communication slots is predetermined.

19. The wireless transmitting station according to claim 17, wherein with respect to the specified communication slot in which the number of transmitting antennas is predetermined, control information including the number of transmitting antennas is predetermined.

20. The wireless transmitting station according to claim 17, wherein with respect to each of the plurality of communication slots, control information including the number of transmitting antennas is fixed.

21. The wireless transmitting station according to claim 17, wherein with respect to the specified communication slot included in the plurality of communication slots, the control information including the number of transmitting antennas is fixed.

22. The wireless transmitting station according to claim 17, wherein another wireless transmitting station different from the wireless transmitting station uses, during the specified communication slot, transmitting antennas of same number of transmitting antennas as the number of transmitting antennas used by the wireless transmitting station in the specified communication slot.

23. The wireless transmitting station according to claim 17, wherein the predetermined number of transmitting antennas which is used in the communication slot is notified to a wireless receiving station that communicates with the wireless transmitting station.

24. A wireless transmitting station comprising:
a plurality of transmitting antennas;
a transmitting unit that transmits a signal by means of at least one of the plurality of transmitting antennas in a specified communication slot included in a plurality of communication slots, wherein a number of transmitting antennas, in the at least one of the plurality of transmitting antennas, to be used at a time of transmitting the signal in the specified communication slot is predetermined; and
a storage unit that stores a correspondence between the plurality of communication slots and the number of transmitting antennas to be used in each of the plurality of communication slots,
wherein the number of transmitting antennas to be used in each communication slot, in the plurality of communication slots, is determined through a reference of the storage unit.

25. A wireless transmitting station, comprising:
a plurality of transmitting antennas; and
a transmitting unit that transmits, in a communication slot where a number of transmitting antennas to be used at a time of transmitting a signal is predetermined, the transmitting signal by means of at least one of the plurality of transmitting antennas corresponding to the predetermined number of transmitting antennas,
wherein a specified communication slot to be used by a wireless receiving station that communicates with the wireless transmitting station and control information including the number of transmitting antennas, which is applied to the specified communication slot, are determined on the basis of an amount of interference from a wireless transmitting station which is different from the wireless transmitting station at the wireless receiving station.

26. A wireless transmitting station, comprising:
a plurality of transmitting antennas;
a transmitting unit that transmits a signal to a wireless receiving station by using a communication slot which is assigned to the wireless receiving station that communicates with the wireless transmitting station; and
a determining unit that determines a number of transmitting antennas to be used in the communication slot so that a number of propagation paths which are generated between the wireless transmitting station and the wireless receiving station in the assigned communication slot is smaller than a number of propagation paths which can be estimated by the wireless receiving station in a case where the wireless receiving station receives the signal from the wireless transmitting station and an interference signal from a wireless transmitting station which is different from the wireless transmitting station in the assigned communication slot.

27. The wireless transmitting station according to claim 26, wherein the determining unit determines a modulation system of transmitted data which is used by the wireless transmitting station in the communication slot that is assigned to the wireless receiving station.

28. The wireless transmitting station according to claim 26, wherein the determining unit determines the number of transmitting antennas so that a sum of the number of propagation paths between the wireless transmitting station and the wireless receiving station and the number of propagation paths between the wireless receiving station and the different wireless transmitting station is equal to or smaller than the number of propagation paths that can be estimated by the wireless receiving station.

29. The wireless transmitting station according to claim 26, wherein a received electric power of the interference signal from the different wireless transmitting station is received from the wireless receiving station, and control information including identification information of the communication slot to be assigned to the wireless receiving station which is determined on the basis of the received electric power and the number of transmitting antennas to be used by the communication slot is transmitted to the wireless receiving station.

30. The wireless transmitting station according to claim 29, wherein the number of transmitting antennas that is included in the control information is determined such that a sum of the number of propagation paths between the wireless transmitting station and the wireless receiving station and the number of propagation paths between the different wireless transmitting station and the wireless receiving station is equal to or smaller than a number of propagation paths which can be estimated by the wireless receiving station.

31. The wireless transmitting station according to claim 26, further comprising a unit to hand over one of first and second wireless receiving stations to a wireless transmitting station that is different from the wireless transmitting station in a case where a report of a received electric power from the different wireless transmitting station is received respectively from the first wireless receiving station and the second wireless receiving station,
wherein the determining unit determines the number of transmitting antennas to be used in the transmitting station so that the number of propagation paths generated in the first and second wireless receiving stations is equal to or smaller than a number of propagation paths which can be estimated by the first and second wireless receiving stations in a communication slot that is assigned to the other of the first and second wireless receiving stations after the handover.

32. The wireless transmitting station according to claim 26, wherein the wireless transmitting station is a part of a base transceiver station to transmit signals to a communication area that is composed of a plurality of sectors.

* * * * *